United States Patent
Lefort et al.

(10) Patent No.: US 10,943,707 B2
(45) Date of Patent: Mar. 9, 2021

(54) RUBIDIUM ELUTION SYSTEM CONTROL

(71) Applicants: Jubilant Draximage, Inc., Quebec (CA); Ottawa Heart Institute Research Corporation, Ontario (CA)

(72) Inventors: Etienne Lefort, Quebec (CA); Vincenzo Teoli, Quebec (CA); Robert A. Dekemp, Ontario (CA); Ran Klein, Ontario (CA)

(73) Assignees: Jubilant Draximage, Inc.; Ottawa Heart Institute Research Corporation

( * ) Notice: Subject to any disclaimer, the term of this patent is extended or adjusted under 35 U.S.C. 154(b) by 652 days.

(21) Appl. No.: 14/426,208

(22) PCT Filed: Oct. 26, 2012

(86) PCT No.: PCT/CA2012/001000
§ 371 (c)(1),
(2) Date: Mar. 5, 2015

(87) PCT Pub. No.: WO2014/036627
PCT Pub. Date: Mar. 13, 2014

(65) Prior Publication Data
US 2015/0228368 A1 Aug. 13, 2015

Related U.S. Application Data

(60) Provisional application No. 61/697,244, filed on Sep. 5, 2012.

(51) Int. Cl.
*G21G 1/00* (2006.01)
*F04B 49/06* (2006.01)
*G05B 15/02* (2006.01)

(52) U.S. Cl.
CPC ......... *G21G 1/0005* (2013.01); *F04B 49/065* (2013.01); *G05B 15/02* (2013.01)

(58) Field of Classification Search
CPC ...... G21G 1/0005; G05B 15/02; F04B 49/065
See application file for complete search history.

(56) References Cited

U.S. PATENT DOCUMENTS

| 4,562,829 A | 1/1986 | Bergner |
| 7,734,331 B2 | 6/2010 | Dhawale |
| (Continued) | | |

FOREIGN PATENT DOCUMENTS

| CN | 1946432 A | 4/2007 |
| EP | 0160303 A2 | 11/1985 |
| (Continued) | | |

OTHER PUBLICATIONS

Klein, "Precise $^{82}$RB Infusion System for Cardiac Perfusion Measurement Using 3D Positron Emission Tomography", Faculty of Engineering, University of Ottawa, Feb. 2005, 147 pages.
(Continued)

*Primary Examiner* — Shogo Sasaki
(74) *Attorney, Agent, or Firm* — BakerHostetler

(57) ABSTRACT

Embodiments of the present invention provide for assessing the state of an $_{82}$Rb elution system. In certain embodiments, a system begins an assessment that comprises an elution, and a metric may be measured. This metric may be a concentration of $_{82}$Rb, $_{82}$Sr, or $_{85}$Sr in a fluid that is eluted from the generator, the volume of the fluid that is eluted from the generator, or the pressure of the fluid flowing through at least one portion of the system. If the assessment is completed, an output may be generated on a user interface that recommends a course of action, or no course of action, based on a result of the assessment. Should the assessment not complete successfully because it is interrupted, a $_{82}$Sr/$_{82}$Rb generator of the system may be halted so as to prevent a user from performing an end-run around these quality control mechanisms of the $_{82}$Rb elution system.

14 Claims, 16 Drawing Sheets

(56) References Cited

U.S. PATENT DOCUMENTS

| | | |
|---|---|---|
| 8,071,959 B2 | 12/2011 | deKemp |
| 2007/0140958 A1 | 6/2007 | deKemp |
| 2007/0213848 A1 | 9/2007 | deKemp et al. |
| 2008/0149847 A1 | 6/2008 | Casale et al. |
| 2009/0309465 A1 | 12/2009 | Quirico et al. |
| 2009/0312630 A1 | 12/2009 | Hidem et al. |
| 2009/0312635 A1 | 12/2009 | Shimchuk et al. |
| 2009/0318745 A1 | 12/2009 | Quirico et al. |
| 2010/0121184 A1 | 5/2010 | Dhawale et al. |
| 2010/0312039 A1 | 12/2010 | Quirico et al. |
| 2011/0172524 A1 | 7/2011 | Hidem et al. |
| 2011/0178359 A1 | 7/2011 | Hirschman et al. |

FOREIGN PATENT DOCUMENTS

| | | |
|---|---|---|
| EP | 2135630 A1 | 12/2009 |
| JP | 59-163584 A | 9/1984 |
| JP | 10-057299 A | 3/1998 |
| JP | 2002-282362 | 10/2002 |
| WO | 20071071022 A1 | 6/2007 |
| WO | WO 2007/104133 A1 | 9/2007 |
| WO | WO 2008/083313 A2 | 7/2008 |
| WO | WO 2009/152320 A2 | 12/2009 |
| WO | WO 2009/152323 A2 | 12/2009 |
| WO | 20111127469 A1 | 10/2011 |
| WO | WO 2011/126522 A2 | 10/2011 |
| WO | WO 2014/036627 A1 | 3/2014 |

OTHER PUBLICATIONS

Bracco Diagnostics Inc., "Cardiogen-82 Assay Label" U.S. Food and Drug Administration, 2012 original file name: D03_CardioGen82_label_2012.pdf.

United States Pharmacopeia (USP) 40, "Rubidium Chloride Rb 82 Injection", Aug. 1, 2017, pp. 6082-6083.

Wikipedia, "end-Run", Jun. 2018, 1 page.

Wiktionary entry, "end-run", Dec. 2011.

Daily Sr-82/Sr-85 Breakthrough

Volume Monitoring

Daily QC

Devices monitoring

Activity monitoring if signal from computer to controller
is lost, pump shuts down

RUBIDIUM ELUTION SYSTEM CONTROL

CROSS-REFERENCE TO RELATED APPLICATIONS

This application is the National Stage of International Application No. PCT/CA2012/001000 filed Oct. 26, 2012, which claims the benefit of and priority to U.S. Provisional Application No. 61/697,244, filed Sep. 5, 2012, the entireties of which applications are incorporated herein by reference for any and all purposes.

TECHNICAL FIELD

The present application relates in general to nuclear medicine and, in particular, to rubidium elution control systems.

BACKGROUND

As is well known in the art, Rubidium ($^{82}$Rb) is used as a positron emission tomography (PET) tracer for non-invasive measurement of myocardial perfusion (blood flow).

Recent improvements in PET technology have introduced 3-dimensional positron emission tomography (3D PET). Although 3D PET technology may permit more efficient diagnosis and prognosis in patients with suspected coronary artery disease, the sensitivity of 3D PET requires very accurate control of the delivery of $^{82}$Rb activity to a patient being assessed.

FIGS. 1 and 2 illustrate a conventional rubidium elution system used for myocardial perfusion imaging. As may be seen in FIG. 1, the elution system comprises a reservoir 4 of sterile saline solution (e.g. 0.9% Sodium Chloride Injection), a pump 6, and a strontium-rubidium ($^{82}$Sr/$^{82}$Rb) generator 8. In operation, the pump causes the saline solution to flow from the reservoir 4 and through the generator 8 to elute the $^{82}$Rb. The active solution output from the generator 8 is then supplied to a patient (not shown) via a patient outlet 10.

When the system 2 is not in use, the amount of $^{82}$Rb within the generator 8 accumulates until a balance is reached between the rate of $^{82}$Rb production (that is, $^{82}$Sr decay) and the rate of $^{82}$Rb decay. As a result, the $^{82}$Rb activity level in the active saline emerging from the generator 8 tends to follow a "bolus" profile 12 shown by the solid line in FIG. 2a. In particular, at the start of an $^{82}$Rb elution "run," the activity level rises rapidly and peaks, as accumulated $^{82}$Rb is flushed out of the generator 8. Thereafter, the activity level drops back to a substantially constant value. The maximum activity level A, (bolus peak) obtained during the run is dependent on the amount of accumulated $^{82}$Rb in the generator 8, and thus is generally a function of the system's recent usage history, principally: the current $^{82}$Rb production rate; the amount of accumulated $^{82}$Rb (if any) remaining at the end of the previous elution run; and the idle time since the previous run. The generally constant level of the bolus tail is dependent on the rate of $^{82}$Rb production and the saline flow rate produced by the pump 6.

As is well known in the art, $^{82}$Rb is generated by radioactive decay of $^{82}$Sr, and thus the rate of $^{82}$Rb production at any particular time is a function of the mass of remaining $^{82}$Sr. As will be appreciated, this value will diminish (exponentially) through the useful life of the generator 8. The result is a family of bolus curves, illustrated by the dashed lines of FIG. 2a, mapping the change in elution system performance over the useful life of the generator 8.

Because of the high activity level of $^{82}$Rb possible in the generator 8, it is desirable to limit the total activity dosage delivered to the patient during any given elution run. The total elution time required to reach this maximum permissible dose (for any given flow rate) will therefore vary over the life of the $^{82}$Sr charge in the generator 8, as may be seen in FIG. 2b, where the total activity, represented by the area under each curve, is equal in both cases.

A limitation of this approach, particularly for 3D PET imaging, is that the delivery of a high activity rate over a short period of time tends to degrade image quality. Low activity rates supplied over a relatively extended period are preferred. As a result, the user is required to estimate the saline flow rate that will obtain the best possible image quality, given the age of the generator and its recent usage history, both of which will affect the bolus peak and tail levels. This estimate must be continuously adjusted throughout the life of the generator 8, as the $^{82}$Sr decays.

There are many problems with controlling an $^{82}$Rb elution system that enable a desired activity level to be supplied over a desired period of time, independently of a state of the $^{82}$Sr/$^{82}$Rb generator, some of which are well known.

SUMMARY

Accordingly, an object of the present invention is to provide techniques for controlling an $^{82}$Rb elution system.

Embodiments of the present invention provide for assessing the state of an $^{82}$Rb elution system. In an embodiment, a system begins an assessment includes an elution of fluid through a radioisotope generator. As the assessment begins, a metric may be measured. This metric may be a concentration of $^{82}$Rb, $^{82}$Sr, or $^{85}$Sr in a fluid that is eluted from the generator, the volume of the fluid that is eluted from the generator, or the pressure of the fluid flowing through at least one portion of the system. If the assessment is completed, several steps may be taken. An output may be generated on a user interface that recommends a course of action, or no course of action, based on a result of the assessment. An indication of the result of the assessment may be stored in a memory location. Additionally, an indication of the result of the assessment may be uploaded to another computer via a communications network. Should the assessment not complete successfully because it is interrupted, a $^{82}$Sr/$^{82}$Rb generator of the system may be halted so as to prevent a user from performing an end-run around these quality control mechanisms of the $^{82}$Rb elution system.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF ILLUSTRATIVE EMBODIMENTS

The present invention provides a Rubidium ($^{82}$Rb) elution and control system in which the $^{82}$Rb activity rate delivered to a patient can be controlled substantially independently of the condition of the $^{82}$Sr/$^{82}$Rb generator. Representative embodiments are described below with reference to FIGS. 3-8.

Figure 3:
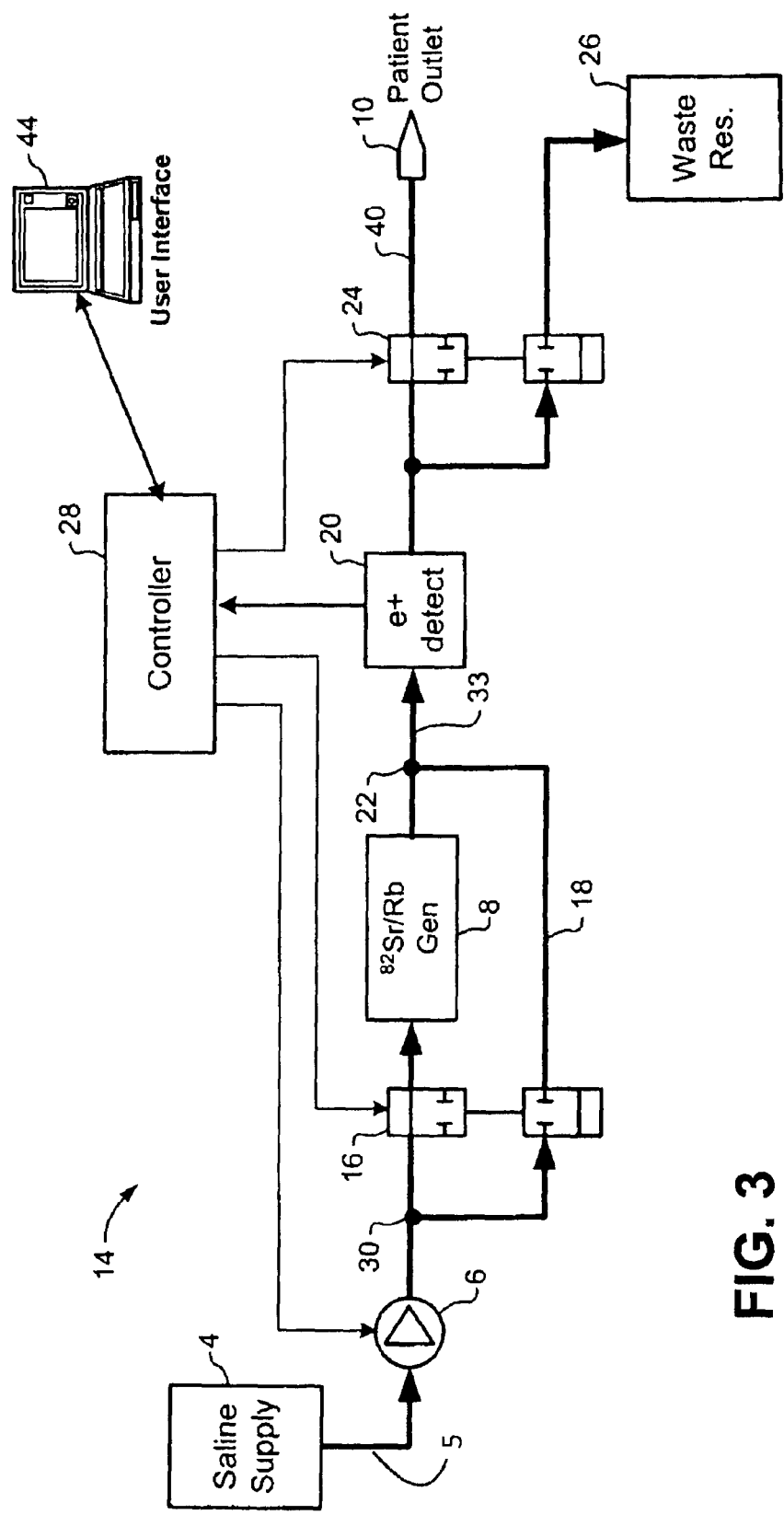
FIG. 3 is a block diagram schematically illustrating principal elements of a Rubidium elution system in accordance with an embodiment of the present invention.
Figure 4:
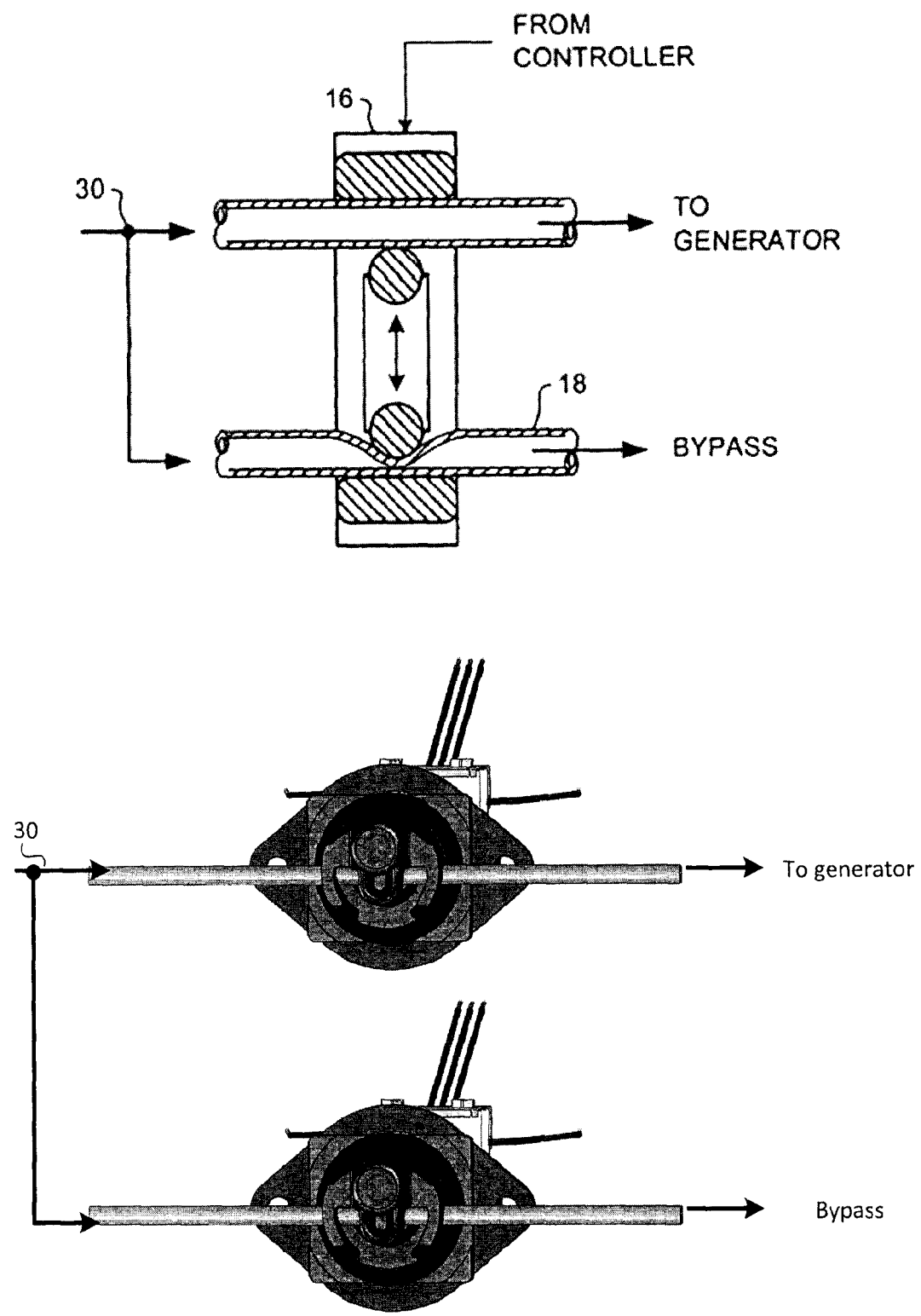
FIG. 4 illustrates two pinch-type valve arrangements usable in the elution system of FIG. 3.

In the embodiment of FIG. 3, the elution system comprises reservoir 4 of sterile saline solution (e.g. 0.9% Sodium Chloride Injection); a pump 6 for drawing saline from the reservoir 4 through the generator line in 5 at a desired flow rate; a generator valve 16 for proportioning the saline flow between a strontium-rubidium ($^{82}$Sr/$^{82}$Rb) generator 8 and a bypass line 18 which circumvents the generator 8; a positron detector 20 located downstream of the merge point 22 at which the generator and bypass flows merge; and a patient valve 24 for controlling supply of active saline to a patient outlet 10 and a waste reservoir 26. A controller 28 is connected to the pump 6, positron detector 20 and valves 16 and 24 to control the elution system 14 in accordance with a desired control algorithm, as will be described in greater detail below.

If desired, the strontium-rubidium ($^{82}$Sr/$^{82}$Rb) generator 8 may be constructed in accordance with U.S. Pat. No. 8,071,959. In such cases, the pump 6 may be a low-pressure pump such as a peristaltic pump. However, other types of generators may be used. Similarly, other types of pumps may be used, provided only that the pump selected is appropriate for medical applications and is capable of maintaining a desired saline flow rate through the generator.

The generator and patient valves 16, 24 may be constructed in a variety of ways. In principal, the generator valve may be provided as any suitable valve 16 arrangement capable of proportioning saline flow between the generator 8 and the bypass line 18. If desired, the generator valve may be integrated with the branch point 30 at which the saline flow is divided. Alternatively, the generator valve 16 may be positioned downstream of the branch point 30, as shown in FIG. 3. In embodiments in which flexible (e.g. Silicon) tubing is used to convey the saline flow, the generator valve 16 may be provided as one or more conventional "pinch" valves of the type illustrated in FIG. 4. The use of pinch valves is beneficial in that it enables saline flow to be controlled in a readily repeatable manner, and without direct contact between the saline solution and components of the valve. Factors associated with the design of the patient valve 24 are substantially the same as those discussed above for the generator valve 16, with the exception that the saline flow through the patient valve 24 is (or must be assumed to be) carrying radioactive $^{82}$Rb. Accordingly, while any suitable valve design may be selected for the patient valve 24, it is particularly beneficial to avoid direct contact between the active saline solution and valve components. For this reason, pinch valves are preferred for the patient valve 24.

Figure 5:
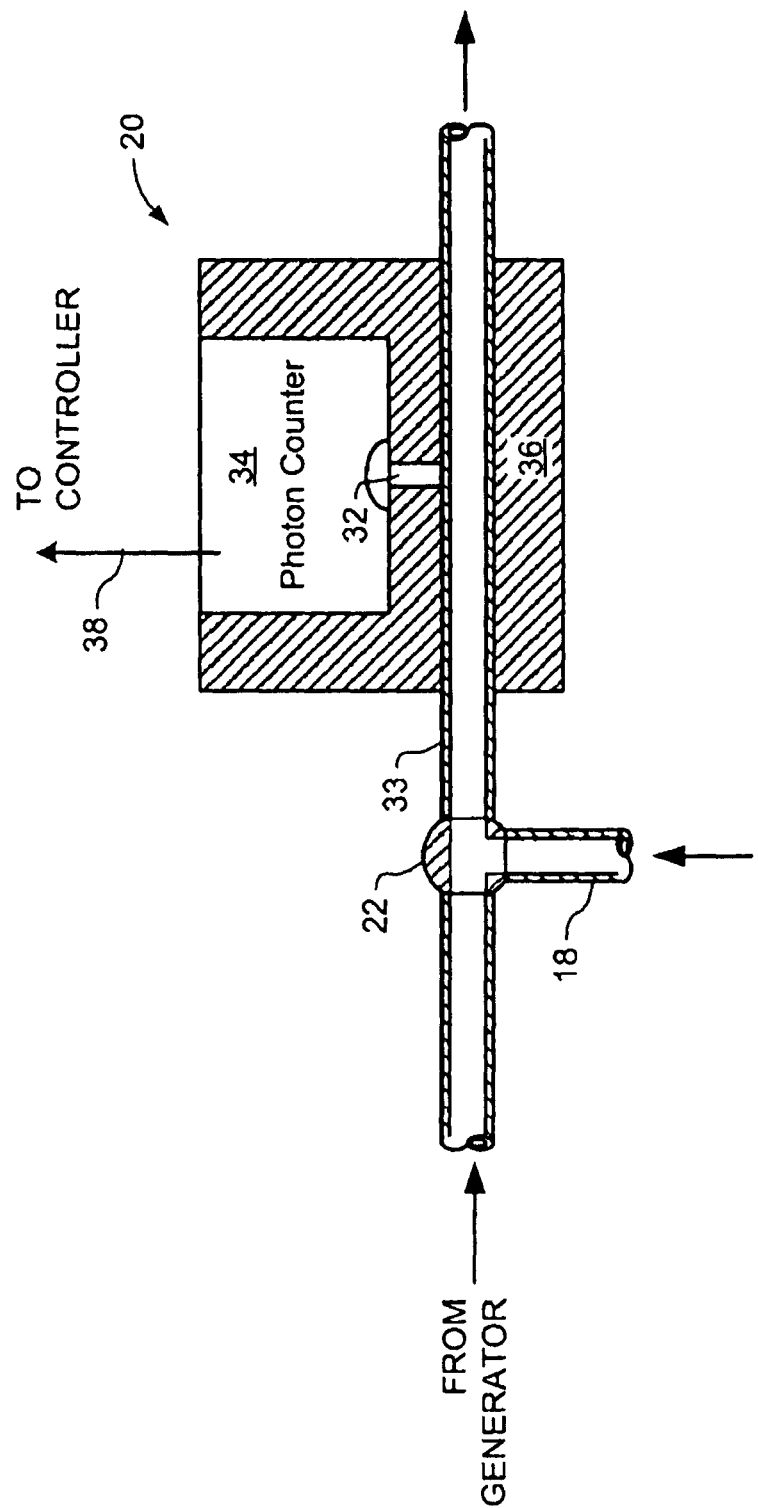
FIG. 5 schematically illustrates a positron detector usable in the elution system of FIG. 3.

As may be seen in FIG. 5, the positron detector 20 may conveniently be provided as a scintillator 32 located immediately adjacent to a feed-line 33 carrying the active saline solution; a photon counter 34 optically coupled to the scintillator 32; and a radiation shield 36 surrounding the scintillator 32 and photon counter 34. The scintillator 32 may be provided by a length of fluorescent optical fiber, which absorbs Beta (e+) radiation generated by $^{82}$Rb decay to produce a photon. The photon counter 34 (which may, for example be an H7155 detector manufactured by Hamamatsu) detects incident photons, and generates a detection signal 38 corresponding to each detected photon. The shielding 36, which may be constructed of lead (Pb), serves to shield the scintillator 32 and photon counter 34 from ambient Gamma and Beta radiation. In some embodiments, the radiation shield 36 is approximately ½ inch thick in the vicinity of the scintillation fiber 32, and may extend (in both directions) at least 5-times the feed-line 33 outer diameter from the scintillation fiber 32. This arrangement effectively suppresses ingress of ambient Gamma and Beta radiation along the channel through which the feed-line 33 passes. As a result, spurious photons are suppressed, and the rate at which photons are counted by the photon counter 34 will be proportional to the $^{82}$Rb activity concentration of the active saline solution adjacent to the scintillator 32. In the illustrated embodiments, the number of photons detected within a predetermined period of time is counted (e.g. by the controller 28), and the count value $C_{det}$ is used as an activity parameter which is proportional to the $^{82}$Rb activity concentration. If desired, a proportionality constant K between the activity parameter $C_{det}$ and the $^{82}$Rb activity concentration can be empirically determined.

In operation, the pump 6 and valves 16, 24 can be controlled to route saline solution through the system 14 in accordance with various modes of operation, as may be seen in FIGS. 6a-6d. Thus, for example, in a "Bypass-to-waste" mode of the system illustrated in FIG. 6a, the generator and patient valves 16, 24 are positioned to route the entire saline flow through the bypass line 18, and into the waste reservoir 26. This mode of operation is suitable for initializing the system 14 immediately prior to beginning an elution run.

Figure 6A:
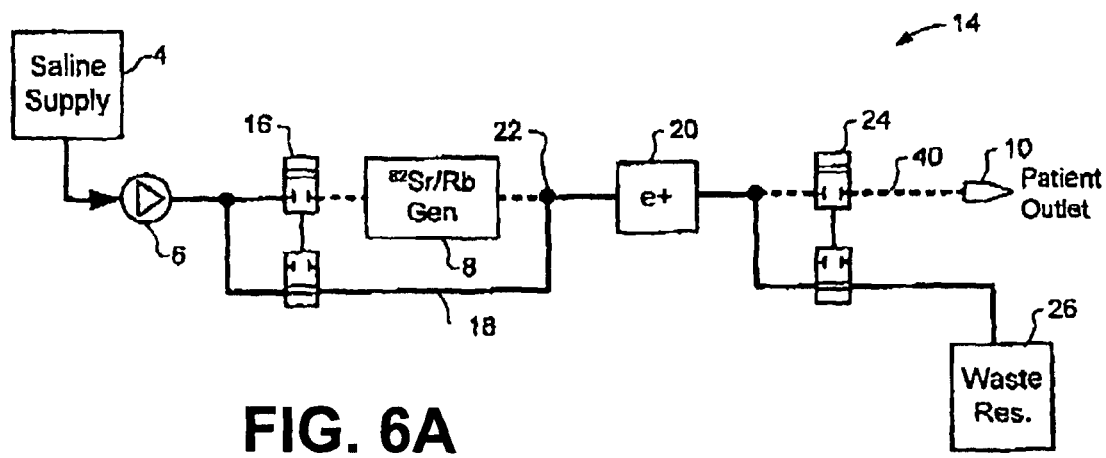
FIGS. 6a-6d schematically illustrate respective operating states of the Rubidium elution system of FIG. 3.
Figure 6B:
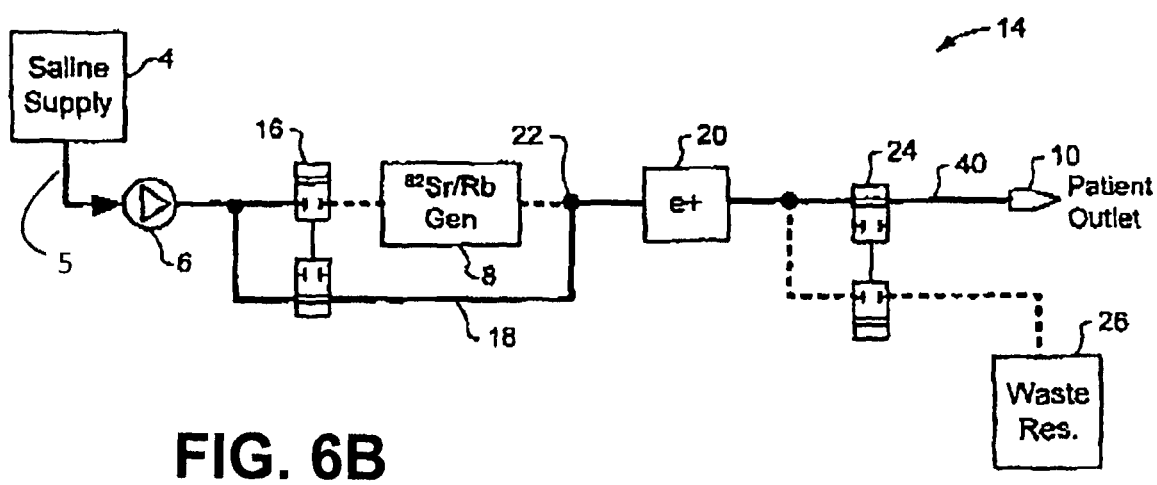

FIG. 6b illustrates a "patient line flush" mode of the system 14, in which the generator and patient valves 16, 24 are positioned to route the saline flow through the bypass line 18 and out through the patient outlet 10. This mode of operation may be used prior to an elution run to prime (that is, expel air from) the patient line 40 in preparation for insertion of the patient outlet into, for example, a vein of a patient. At the end of an elution run, this mode may also be used to flush any $^{82}$Rb activity remaining within the patient line 40 into the patient, thereby ensuring that the patient receives the entire activity dose required for the PET imaging.

Figure 6C:
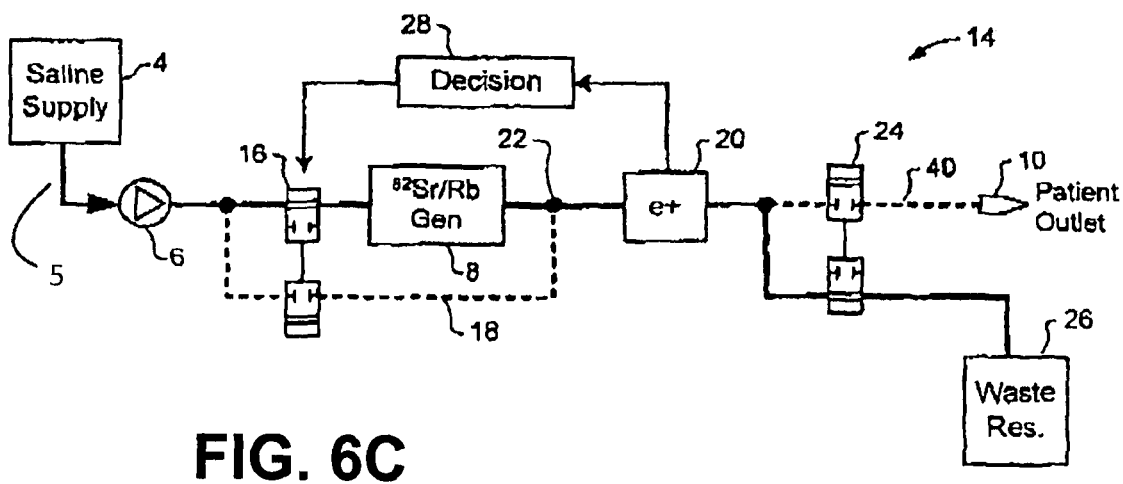

FIG. 6c illustrates a "waiting for threshold" mode of the system 14, in which the generator and patient valves 16, 24 are positioned to route the saline flow through the generator 8, and into the waste reservoir 26. This mode of operation is suitable during the beginning an elution run, while the $^{82}$Rb concentration is increasing from zero, but has not yet reached desired levels. Flushing this leading portion of the $^{82}$Rb bolus 12 to the waste reservoir 26 avoids exposing the patient to unnecessary $^{82}$Rb activity and allows the total activity dosage delivered to the patient to be closely controlled.

Figure 6D:
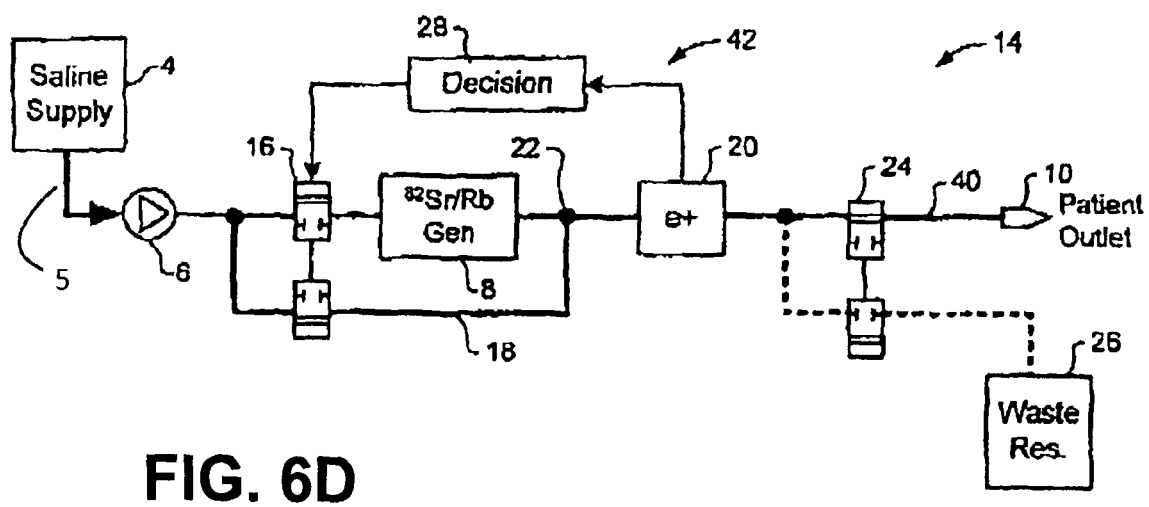

FIG. 6d illustrates an "elution" mode of the system 14, in which the generator valve 16 is actively controlled via a control loop 42 from the positron detector 20 to proportion saline flow through both the generator 8 and the bypass line 18. The generator 8 and bypass saline flows are then recombined (at 22) downstream of the generator 8 to produce an active saline solution having a desired $^{82}$Rb activity concentration. The patient valve 24 is positioned to direct the active saline solution to the patient outlet 10.

In the foregoing description, each operating mode is described in terms of the associated steps in performing an elution run to support PET imaging of a patient. However, it will be appreciated that this context is not essential. Thus, for example, one or more of the above operating modes may be used to facilitate calibration of the system, in which case the patient outlet 10 would be connected to a collection vial inside a conventional dose calibrator (not shown), rather than a patient.

As will be appreciated from the foregoing discussion, each of the operating modes of the elution system is controlled by the controller unit 28 operating under software control. As a result, it is possible to implement a wide variety of automated processes, as required. Thus, for example, elution runs can be fully automated, based on user-entered target parameters, which allows the user to avoid unnecessary radiation exposure. Similarly, it is possible to automate desired system calibration and $^{82}$Sr break-through detection protocols, which ensures consistency as well as limiting radiation exposure of users. A further benefit of software-based elution system control is that data logs from each elution run can be easily maintained, which assists not only system diagnostics, but can also be used to ensure that the elution parameters (e.g. elution concentration and duration) specified for PET imaging have been satisfied.

As described above, in the "elution" mode of operation (FIG. 6d), the generator valve 16 is actively controlled via a control loop 42 from the positron detector 20 to proportion saline flow through both the generator 8 and the bypass line 18. Recombining the corresponding generator and bypass saline flows downstream of the generator 8 produces an active saline solution having a desired $^{82}$Rb activity concentration. Preferably, the control loop 42 is implemented using suitable software executing in the controller 28. Representative algorithms for implementing the control loop 42 are described below with reference to FIGS. 7 and 8.

In the embodiment of FIG. 7, the controller 28 implements a threshold-based control algorithm, in which the generator valve 16 is controlled by comparison of measured activity concentration to a desired activity concentration. If the measured concentration is higher than the desired concentration, the generator valve 16 directs saline flow to the bypass line 18 rather than the generator 8, and vice versa.

In general, the elution run is designed to generate a target $^{82}$Rb activity concentration which follows a desired function in time $C_M(t)$. In the embodiment of FIG. 7, $C_M(t)$ is a square-wave function having a predetermined constant activity concentration $C_M$ and duration $(t_2-t_1)$, as may be seen by the dotted line of FIG. 7b. These parameters may be provided by explicit user input using the user interface 44 (FIG. 3), or calculated from other user-input parameters, such as a total activity dosage and saline flow rate. As will be appreciated, the target activity profile $C_M(t)$ need not be a square-wave function, other profiles may be used, such as a ramp function, if desired.

In some embodiments, the target activity profile $C_M(t)$ may define the desired $^{82}$Rb activity concentration at the patient outlet 10. In such cases, an adjusted target profile $C'_M(t)$ may be computed based on the selected flow rate and patient supply line length, to account for expected $^{82}$Rb decay (and thus loss of activity) in the patient supply line 40 between the positron detector 20 and the patient outlet 10. This arrangement is advantageous in that it allows a user to specify an amount of activity (either activity concentration or total dose) delivered to the patient, and the control loop 42 will operate to match this specification, taking into account the $^{82}$Rb decay within the system 14.

Figure 7A:
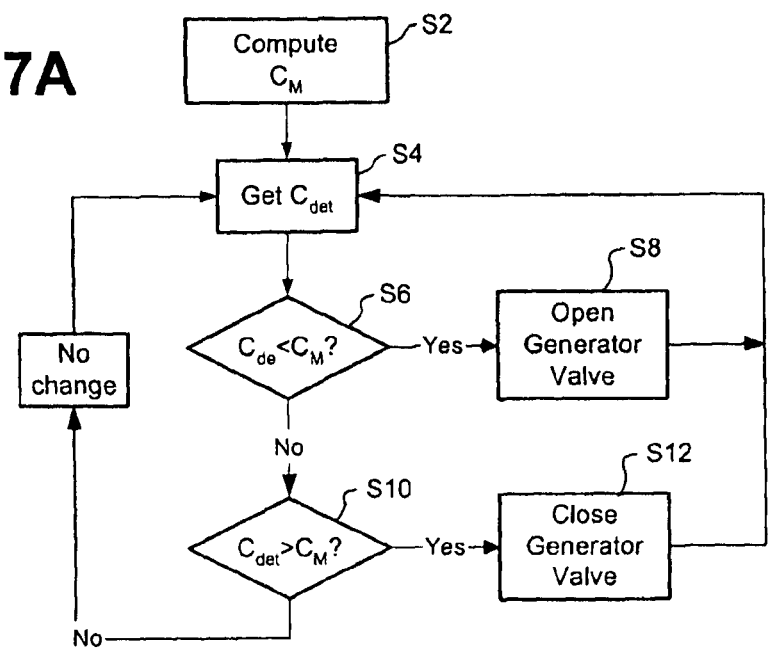
FIGS. 7a-7c schematically illustrate a first algorithm for controlling the Rubidium elution system of FIG. 3.
Figure 7B:
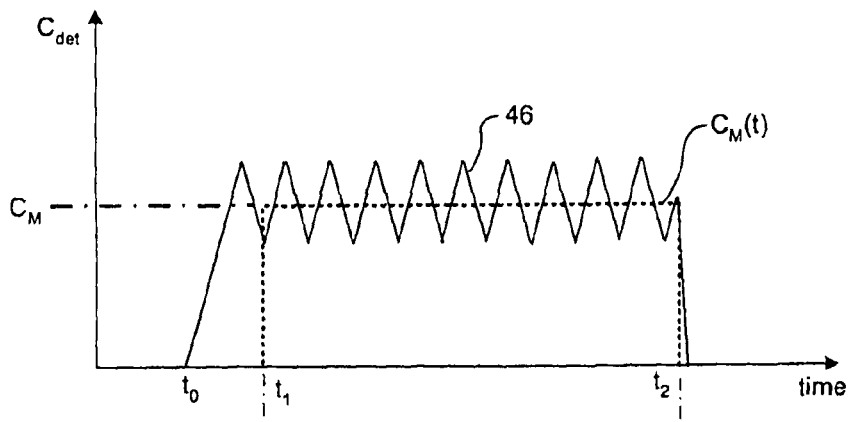

FIG. 7a is a flow chart illustrating a representative threshold-based valve control algorithm which may be used in the embodiment of FIG. 7. For ease of illustration, the flow-chart of FIG. 7a only illustrates the control loop. Process steps and threshold, related to transitioning between various modes of operation are not shown.

In preparation for an elution run, a user enters target parameters for the elution. These parameters may include any three of: total activity dose, target activity concentration, elution duration, and saline flow rate. From the entered parameters, the remaining parameter can be calculated, and, if desired, an adjusted target profile $C'_M(t)$ obtained (step S2).

Figure 2B:
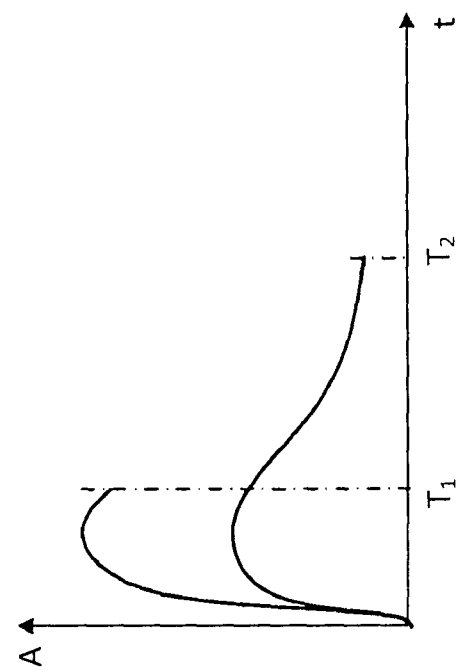
FIGS. 2a and 2b are graphs illustrating representative performance of the elution system of FIG. 1.
Figure 2A:
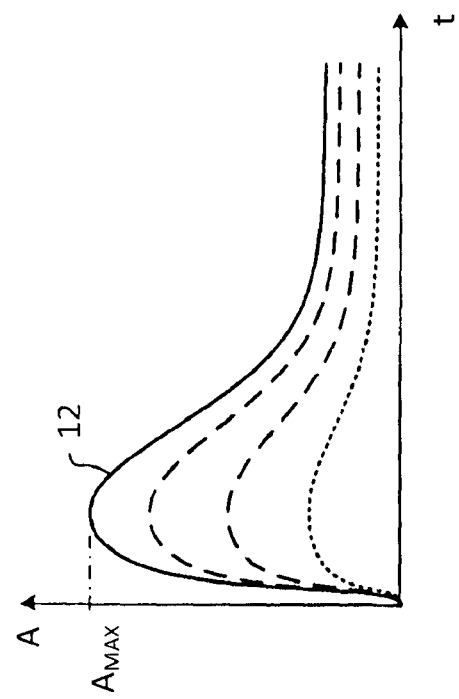

At the start of the elution run, a "bypass to waste" step is optionally used to flush lines and prime the patient line 40. Then, the controller 28 opens the generator valve 16 (at time $t_0$ in FIG. 7b) to place the elution system 14 into the "Waiting for Threshold" mode. During this period, the activity level detected by the positron detector will begin to ramp up following the leading edge of the 'natural' bolus curve 12 (FIG. 2a). During this period, the patient valve 24 remains closed, so that any activity eluted from the generator 8 is passed to the waste reservoir 26. When the detected activity concentration $C_{det}$ exceeds the target value $C_M$, the controller 28 opens the patient valve 24 (at time $t_1$ in FIG. 7b), and shifts to the "elution" mode of operation.

During the elution mode, the controller 28 iteratively obtains an updated concentration parameter $C_{det}$ (at S4), which indicates the instantaneous activity concentration at the positron detector. The concentration parameter $C_{det}$ is then compared to the desired concentration $C_M$. If $C_{det}$ is below the desired concentration $C_M$ (at S6), the generator valve 16 is opened (at S8) so that saline flows through the generator 8 to elute $^{82}$Rb activity. If $C_{det}$ is above the desired concentration $C_M$ (at S10), the generator valve 16 is closed (at S12) so that saline flows through the bypass line 18. As may be seen in FIG. 7b, due to delay in response, the result of this operation is a saw-tooth activity concentration profile 46 centered on the target concentration $C_M$ (or $C'_M$). At the end of the elution run (time $t_2$ in FIG. 7b), the controller 28 closes the generator valve 16 and places the elution system 14 into the "Patient line Flush" mode, which terminates elution of $^{82}$Rb activity from the generator 8 and flushes any remaining $^{82}$Rb activity within the patient line 40 into the patient.

Figure 7C:
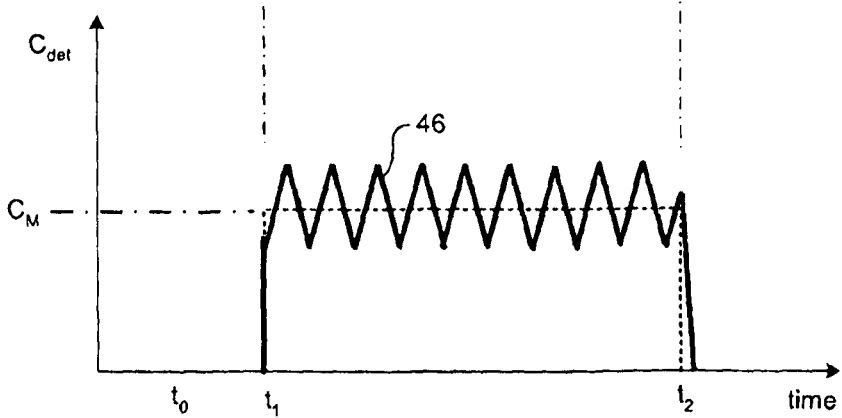

FIG. 7c illustrates the activity concentration profile delivered to the patient as a result of the above-described process. As may be seen from FIG. 7c, no $^{82}$Rb activity is delivered to the patient during the "Waiting for Threshold" mode ($t_0$-$t_1$). During the "elution" mode ($t_1$-$t_2$, the activity concentration 46 follows a saw-tooth pattern centered on the target concentration $C_M$ (or $C'_M$). Finally, in "Patient line Flush" mode (following $t_2$) the activity concentration drops rapidly as $^{82}$Rb elution is terminated and residual activity is flushed from the patient supply line 40.

As will be appreciated, the accuracy with which the delivered activity concentration follows the target profile $C_M(t)$ is largely dependent on the line volume between the merge point 22 and the positron detector 20. In some cases relatively large excursions from the target profile $C_M(t)$ are acceptable. However the control loop response is such that the difference cannot be reduced past a certain limit. As a result, the "error" between the target profile $C_M(t)$ and the delivered concentration profile 46 (FIG. 7c) cannot be eliminated in the embodiment of FIG. 7. A pulse-width modulation technique which overcomes this limitation is described below with reference to FIG. 8.

The embodiment of FIG. 8 differs from that of FIG. 7 primarily in the manner in which the generator valve 16 is controlled. In the embodiment of FIG. 7, the generator valve 16 is opened or closed based on a comparison between the detected activity concentration $C_{det}$ and desired activity concentration. By contrast, in the embodiment of FIG. 8, the generator valve is opened and closed continuously at a predetermined frequency. Any desired frequency may be used, depending primarily on the physical properties of the generator valve 16. In some embodiments, a frequency of between 1 and 10 Hz (e.g. 5 Hz) may be used. In order to control the proportioning of saline flow between the generator 8 and the bypass line 18, the duty cycle of the valve 16 is varied. Thus, for example, a duty cycle of "0" may have the effect of directing the entire saline flow through the bypass line 18, and a duty cycle of "100" directs the entire saline flow through the generator 8. A duty cycle between these limits divides the saline flow between the generator 8 and bypass line 18 in accordance with the duty cycle value. The precision with which the saline flow can be divided between the generator 8 and bypass line 18 will be determined by a minimum adjustment step size, which can be a programmable value.

As described above, the amount of $^{82}$Rb eluted from the generator 8, for any given flow rate, will depend on the recent usage history of the elution system 14, and the instantaneous production rate of $^{82}$Rb within the generator 8. Accordingly, it is possible to improve the accuracy of the elution system 14 by implementing a predictive control algorithm, in which models of the valve 16 and generator performance are used to predict the amount of $^{82}$Rb activity that will be eluted from the generator 8 for a given duty cycle setting.

In particular, the generator performance can be modeled to predict the amount of $^{82}$Rb activity that will be eluted from the generator for a given flow rate, as will be described in greater detail below. In some embodiments, a dose calibrator (not shown) is used to measure the generator performance in terms of, for example, $^{82}$Rb activity concentration vs. eluted volume. This data can be used to predict eluted $^{82}$Rb activity concentration for any given saline flow rate.

In addition, the generator valve response can be modeled to enable a prediction of the flow rate through the generator for any given total saline flow rate (as determined by the pump control setting) and valve duty cycle. In some embodiments, the valve response may be modeled in terms of respective parameters defining upper and lower duty cycle limits .PI.$_{max}$ and .PI.$_{Min}$, and a flow ratio vs. duty cycle slope L between the upper and lower limits. With this arrangement, the upper duty cycle limit .PI.$_{max}$ represents the value beyond which all of the flow is considered to be directed into the generator 8. Conversely, the lower duty cycle limit .PI.$_{Min}$ represents the value below which all of the flow is considered to be directed into the bypass line 18. The flow ratio vs. duty cycle slope L defines the change in the ratio between the respective flows through the generator 8 and the bypass line 18 for duty cycle values lying between the upper and lower limits.

In cases where the valve response is non-linear, it may be advantageous to replace the flow ratio vs. duty cycle slope parameter L with one or more parameters defining a mathematical valve response curve.

At the start of the elution run, the controller 28 opens the generator valve 16 (at time to in FIG. 8b) to place the elution system into the "Waiting for Threshold" mode. During this period, the activity level detected by the positron detector 20 will begin to ramp up following the leading edge of the 'natural' bolus curve 12 (FIG. 2a). During this period, the patient valve 24 remains closed, so that any activity eluted from the generator is passed to the waste reservoir 26. When the detected activity concentration reaches the target concentration $C_M$ (or adjusted target $C'_M$, as applicable), the controller 28 opens the patient valve 24 (at time $t_1$ in FIG. 8b), and shifts to the "elution" mode of operation.

During the elution mode, the controller 28 implements a predictive control algorithm in which previously stored generator performance data is used (at S14) to estimate a flow ratio that will yield the target activity concentration $C_M$ (or $C'_M$) at the positron detector 20, for the selected flow rate of the elution run. This estimated (predicted) flow ratio is then used to control the duty cycle of the generator valve 16. The controller 28 then obtains an updated concentration parameter $C_{det}$ (at S16), which indicates the instantaneous activity concentration at the positron detector 20. The concentration parameter $C_{det}$ is then compared to the target concentration $C_M$ (or $C'_M$) to obtain an error function $\Delta C$ (at S18). Based on the value of the error function $\Delta C$, the duty cycle of the generator valve 16 is adjusted. If $\Delta C<0$ (step S20), the duty cycle is increased (at S22) so that proportionally more saline flows through the generator 8 to elute more $^{82}$Rb activity. If $\Delta C>0$ (step S24), the duty cycle is decreased (at S26) so that proportionally more saline flows through the bypass line 18. If neither condition is satisfied the duty cycle is maintained at its current status (S28). As may be seen in FIG. 8b, the result of this operation is a low-error concentration profile 48 that closely matches the target concentration $C_M$ (or $C'_M$). At the end of the elution run (time $t_2$ in FIG. 8b), the controller 28 closes the generator valve 16 (that is, reduces the duty cycle to "0") and places the elution system 14 into the "Patient line Flush" mode, which terminates elution of $^{82}$Rb activity from the generator 8 and flushes any remaining $^{82}$Rb activity within the patient line 40 into the patient.

Figure 8A:
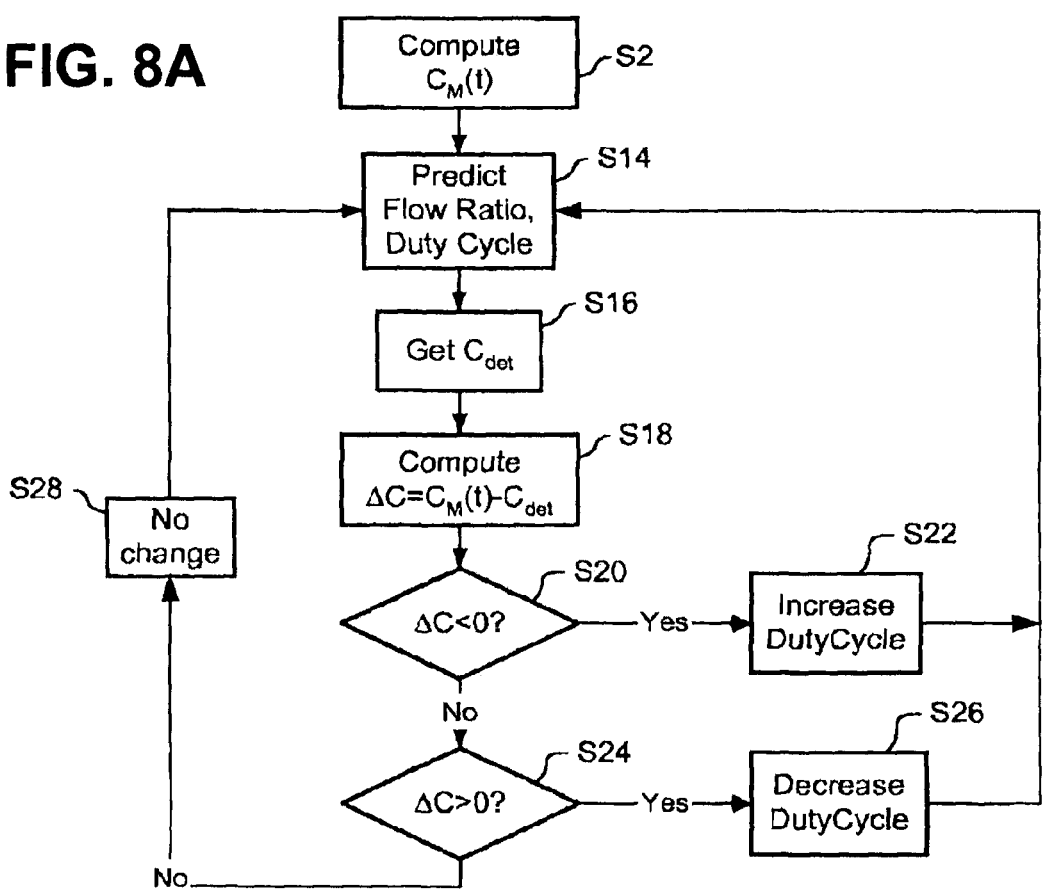
FIGS. 8a-8c schematically illustrate a second algorithm for controlling the Rubidium elution system of FIG. 3.
Figure 8B:
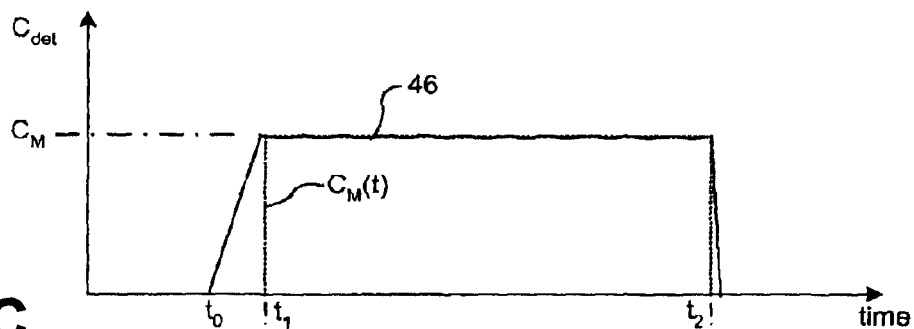
Figure 8C:
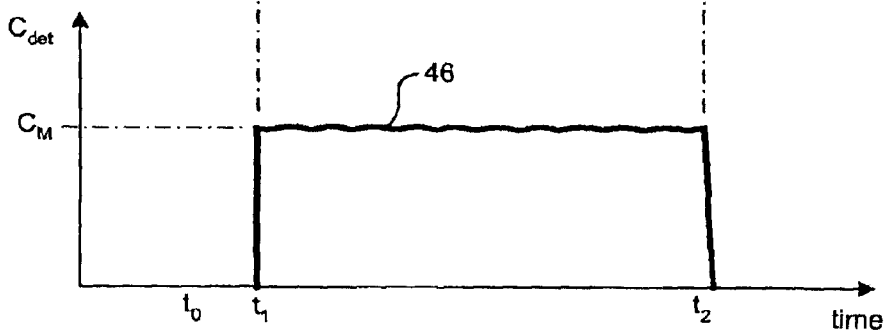

FIG. 8c illustrates the activity concentration profile 48 delivered to the patient as a result of the above-described process. As may be seen from FIG. 8c, no $^{82}$Rb activity is delivered to the patient during the "Waiting for Threshold" mode ($t_0$-$t_1$). During the "elution" mode ($t_1$-$t_2$), the activity concentration closely follows the target concentration $C_M$ (or $C'_M$). Finally, in "Patient line Flush" mode (following $t_2$) the activity concentration drops rapidly as $^{82}$Rb elution is terminated and residual activity is flushed from the patient supply line 40.

In practice, the above-described predictive control algorithm has been found to produce an $^{82}$Rb activity concentration that closely matches the desired target profile $C_M(t)$, except during the first few seconds of the elution, where significant prediction errors may occur. In cases where all of the activity from the generator must be eluted to reach the requested total dosage, this error must be tolerated. However, in other cases it is possible to eliminate the error by delaying the start of the "elution" mode of operation. Thus, for example, during the "waiting for threshold," mode, the detected activity level $C_{det}$ can be monitored and compared to a threshold (e.g. 90% of the target concentration $C_M$). When the threshold level is reached, the generator valve control loop 42 begins operating as described above with reference to FIGS. 8a and 8b, but the patient valve 24 remains closed so that active solution continues to be routed to the waste reservoir 26. After a predetermined delay, the patient valve 24 opens to begin supplying active saline solution to the patient outlet 10. The duration of the delay may be calculated based on the relative activity of the elution. For example, in elutions in which the target activity concentration $C_M$ is less than 10% of the maximum concentration that the generator 8 can produce, a delay of about 10 seconds may be used. Conversely, for elutions in which the target activity concentration $C_M$ is more than about 70% of the maximum concentration that the generator 8 can produce, no delay may be required. For elutions in which the target activity concentration lies between these two limits, an intermediate delay may be calculated.

As described above, the predictive control algorithm uses stored generator performance data to model the generator performance and thereby enable prediction of a valve flow ratio (or, equivalently duty cycle) that will yield the target activity concentration $C_M$ (or $C'_M$) at the positron detector 20. One way of obtaining the generator performance data is to calibrate the elution system 14 by performing a predefined elution run with the patient outlet 10 connected to a conventional dose calibrator (e.g. a Capintec CRC-15). Such a calibration elution run enables the dose calibrator to be used to measure the generator performance in terms of, for example, $^{82}$Rb activity concentration vs. eluted volume. This data can be used to predict eluted $^{82}$Rb activity concentration, for any given saline flow rate, with an accuracy that that will gradually decline with time elapsed since the calibration run. Repeating the calibration run at regular intervals (e.g. once per day) allows the generator performance data to be updated to track changes in the generator performance as the generator 8 ages, and thereby enable accurate flow ratio prediction between successive calibration runs. If desired, calibration elutions can be scheduled to run automatically, for example as part of a daily protocol, which ensures system accuracy and at the same time limiting the potential for human error.

Preferably, calibration elution runs are performed at the same flow rate (e.g. 15 ml/min), and over the same duration (e.g. 1 minute). This enables the known half-life of the $^{82}$Rb (76 seconds) to be used to predict the decay time of activity detected by the dose calibrator. A difference between the predicted and actual decay times indicates breakthrough of $^{82}$Sr. Accordingly, $^{82}$Sr breakthrough can be automatically detected as part of a scheduled system calibration protocol, by sampling the activity level in the dose calibrator at regular intervals throughout the duration of each calibration elution run, and for a predetermined period following completion of the calibration run. The resulting calibration data tracks the activity level within the dose calibrator, as both a function of time and active saline solution volume. Calibration data collected during the elution enables prediction of the $^{82}$Rb decay curve after the elution has stopped. Comparison between this predicted decay curve and the calibration data collected after the elution enables detection of $^{82}$Sr breakthrough.

The calibration data collected during the elution can also be used to calculate the proportionality constant K between the activity parameter $C_{det}$ and the $^{82}$Rb activity concentration. In particular, the instantaneous activity detected by the dose calibrator during the calibration elution is the convolution of the activity concentration and the well known $^{82}$Rb decay curve. Since the saline volumetric flow rate is known, the calibration data collected during the elution can be used to calculate the actual activity concentration of the active saline solution entering the dose calibrator, and thus the proportionality constant K.

In the foregoing description, the predictive control algorithm uses stored generator performance data to predict a valve duty cycle that will yield the target activity concentration $C_M$ (or $C'_M$) at the positron detector, and this estimate is used to control the generator valve 16. An error $\Delta C$ between the detected concentration parameter $C_{det}$ the target activity concentration $C_M$ is then calculated and used to adjust the flow ratio (duty cycle) of the generator valve 16. This error may also be used as data input for a self-tuning algorithm for updating the generator valve response parameters. This functionality is useful for ensuring accuracy of the predictive control algorithm, as well as compensating valve performance changes due, for example, to component aging and wear.

In some embodiments, the self-tuning algorithm uses error data accumulated over a number of elution runs. Thus, for example, during each elution run, desired flow ratios can be calculated (e.g. based on the saline flow rate, target activity concentration $C_M$ and stored generator performance data) and error function $\Delta C$ values stored as a function of desired flow ratio. Accumulation of error value vs. flow ratio data over a number of elution runs can then be processed to obtain a slope error $\Delta L$. This error value can then be used to incrementally adjust the flow ratio vs. duty cycle slope parameter L of the value so as to drive the slope error $\Delta L$ toward zero.

The upper duty cycle limit $.PI._{max}$ may be adjusted based on error data accumulated during elutions in which the predicted activity concentration from the generator cannot satisfy the desired target value $C_M$. This situation can occur during elution runs conducted toward the end of the useful life of the generator 8, when the $^{82}$Rb production rates are at their lowest. When the predicted activity concentration from the generator 8 is less than the desired target value $C_M$, the predictive control algorithm will operate to set the duty cycle at its upper limit value $.PI._{max}$. In this condition, if the measured concentration parameter $C_{det}$ is less than the target value $C_M$, the error function value $\Delta C$ will be a non-zero value, and the corrective loop (FIG. 8a) will attempt to further increase the duty cycle. If no further increase in the concentration parameter $C_{det}$ occurs (as indicated by a change in the function value $\Delta C$), then the upper limit value $.PI._{max}$ may be reduced by a predetermined step size (e.g. $10^{-5}$). On the other hand, if operation of the corrective loop does produce an increase in the detected concentration $C_{det}$, the slope of the error data can be used to increase the upper limit value $PI._{max}$.

If desired, a similar approach can be used to correct for hysteresis of the valve 16. Hysteresis refers to a system behaving differently depending on the direction of change of an input parameter, usually involving a delayed response. In the case of a bi-state pinch valve of the type illustrated in FIG. 4 the opening and closing latencies may differ. This valve hysteresis manifests itself in the threshold-based elution control algorithm described above with reference to FIG. 7, and appears as a difference between a predicted elution duration (required to achieve a desired eluted activity dose) and the actual elution duration required to obtain that dose. Accordingly, by monitoring the actual elution time for "total activity dose"-type elution runs, it is possible to calculate a hysteresis factor H, which can be applied to the threshold set point (i.e. the target activity concentration Cu) to compensate the valve hysteresis.

In the foregoing embodiments, the generator valve is controlled as a bi-state valve, which is either "on" to direct all of the saline solution flow into the generator 8; or "off" to direct all of the saline solution flow into the bypass line 18. In the embodiment of FIG. 7, the generator valve 16 is controlled in precisely this manner, in response to a threshold comparison. In the embodiment of FIG. 8, the valve 16 is cycled continuously at a predetermined frequency (e.g. 5 Hz) and the duty cycle adjusted to emulate a continuously (or step-wise) variable proportioning valve. Both of these methods of valve control are particularly suited to embodiments in which the valve of FIG. 4, for example, is controlled by a solenoid and a spring. However, it will be appreciated that a continuously variable valve could be used, if desired. For example, the position of the valve of FIG. 4 could be controlled by a servo-motor, in which case accurate proportioning of saline flow between the generator and bypass lines could be obtained without cycling the valve between "on" and "off" states. Clearly, use of different generator valve control techniques would imply corresponding differences in the valve control signal and response parameters. However, based on the teachings provided herein, it is considered that all such modifications will be well within the purview of those of ordinary skill in the art, and therefore are contemplated within the scope of the present invention.

FIGS. 9-14 depict additional embodiments of the invention.

Figure 1A:
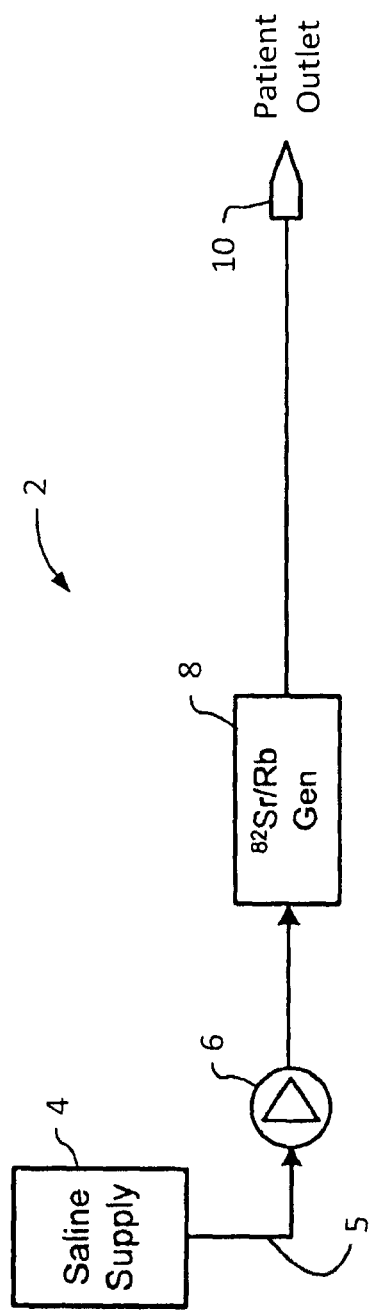
FIG. 1 is a block diagram schematically illustrating principal elements of a conventional Rubidium elution system.
Figure 9:
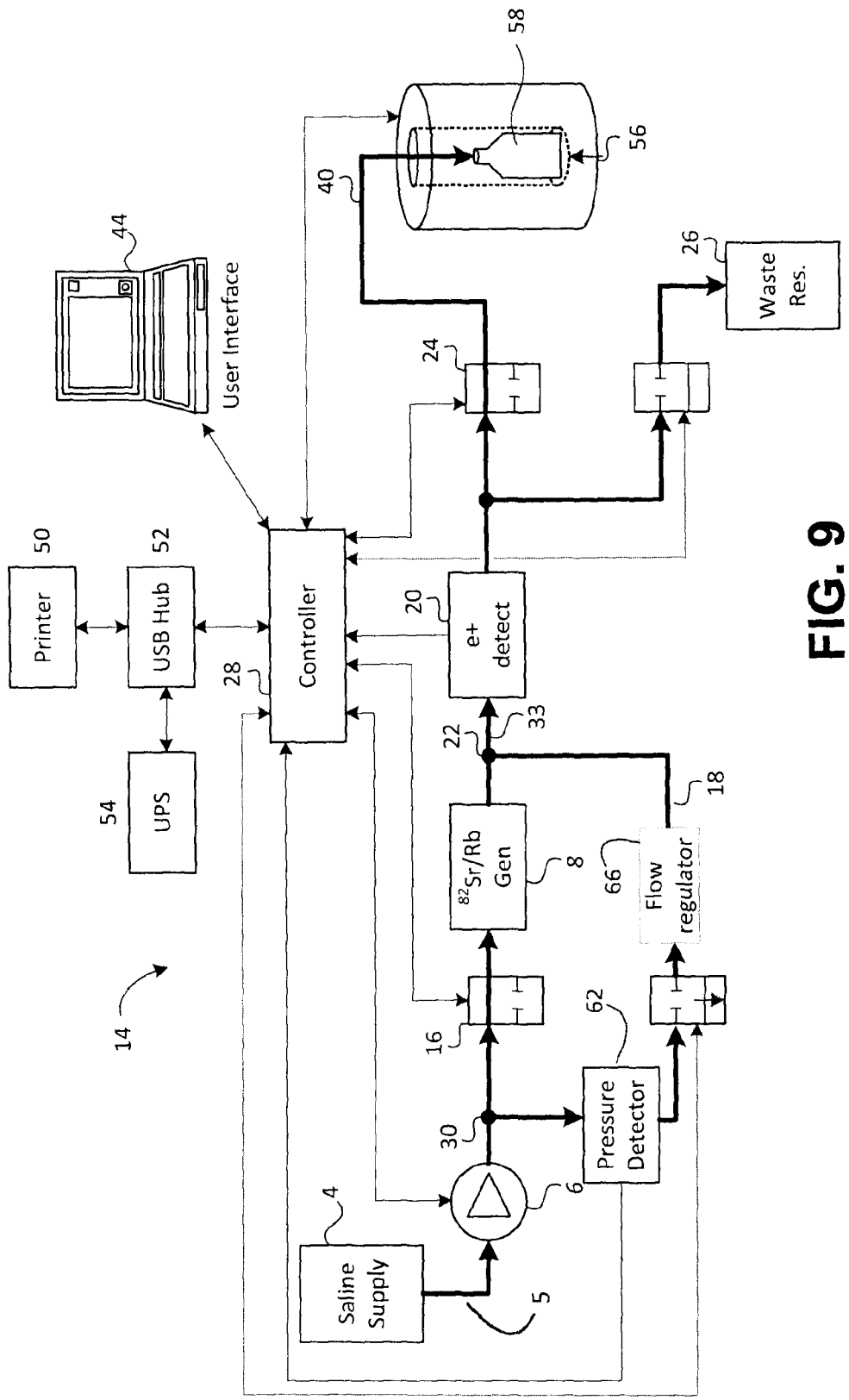
FIG. 9 is a block diagram schematically illustrating principal elements of a Rubidium elution system in accordance with another embodiment of the present invention.

FIG. 9 is a block diagram schematically illustrating principal elements of a Rubidium elution system in accordance with another embodiment of the present invention. The Rubidium elution system of FIG. 9 may have similar elements as the Rubidium elution system of FIG. 1. The Rubidium elution system of FIG. 9 also may have additional elements. These additional elements may include any one or more of a printer 50 and USB (Universal Serial Bus; or other communications port) port 52, a pressure detector 62, a dose calibrator 56, a flow regulator 66, and a UPS (Uninterruptible Power Supply) 54.

The Rubidium elution system of FIG. 9 may be used to assess various aspects of the system, such as a concentration of $^{82}$Rb, $^{82}$Sr, or $^{85}$Sr in a fluid that is eluted from the generator, the volume of the fluid that is eluted from the generator, or the pressure of the fluid flowing through at least one portion of the system. Information about these aspects of the system may be gathered by various elements of the system, and sent to the controller. The controller and/or user interface computer (which may comprise a processor and memory) may analyze this gathered data to assess the state of the system.

As depicted, the pressure detector 62 is configured to detect the in-line pressure of the bypass line, and to convey information about this pressure to the controller. The pressure detector may be configured to detect the in-line pressure elsewhere within the system, such as the feed-line (saline supply-line).

The user interface computer is depicted as being connected to a printer 50, and having a USB port. The user interface of the user interface computer may be used to generate an output on the user interface that recommends a course of action or no course of action, based on a result of the assessment The printer 50 may be used to print out information about the state of the system, such as a concentration of $^{82}$Rb, $^{82}$Sr, or $^{85}$Sr in a fluid that is eluted from the generator, the volume of the fluid that is eluted from the generator, or the pressure of the fluid flowing through at least one portion of the system. The USB port may be used to store an indication of the result of the assessment in a memory location, such as a flash drive.

Additionally, the user interface computer may be configured to communicate with a remote computer, such as a server, or a cloud computing service. The user interface computer may upload an indication of the result of the assessment to a computer via a communications network. The remote computer may collect information from multiple computers, and use this collected information to identify the state of a single elution system, or aggregate statistics for multiple $^{82}$Sr/$^{82}$Rb elution systems.

The elution system of FIG. 9 may additionally have a dose calibrator 56. The dose calibrator 56 may be used instead of a patient outlet, or in addition to a patient outlet, along with a valve that may be configured to direct fluid to the patient outlet or to the dose calibrator. The dose calibrator 56 may comprise a vial 58 (such as a 50 mL vial) that collects the fluid as it otherwise exits the elution system. The dose calibrator 56 may be communicatively coupled to the controller, and configured to send information to the controller, such as an activity concentration of $^{82}$Rb, $^{82}$Sr, or $^{85}$Sr in a fluid that is eluted from the generator, or the volume of the fluid that is eluted from the generator. The dose calibrator 56 may include a radioactivity shielding material.

Figure 9A:
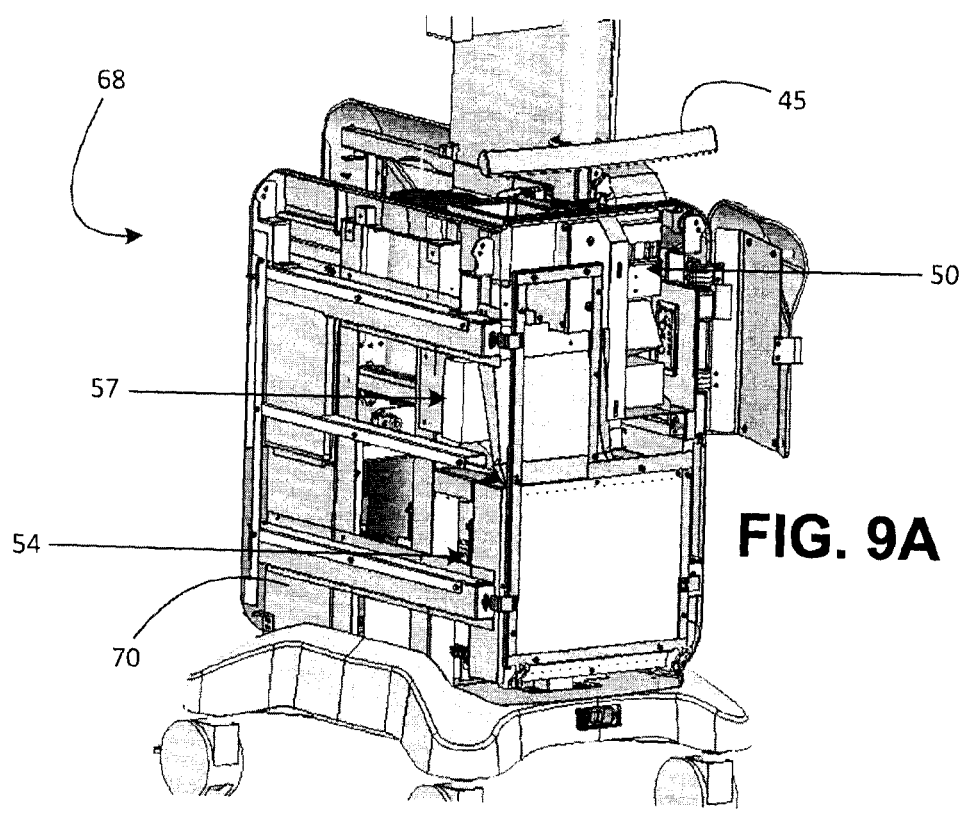
FIGS. 9A, 9B, and 9C are diagrams illustrating embodiments of a Rubidium elution system in accordance with another embodiment of the present invention.
Figure 9B:
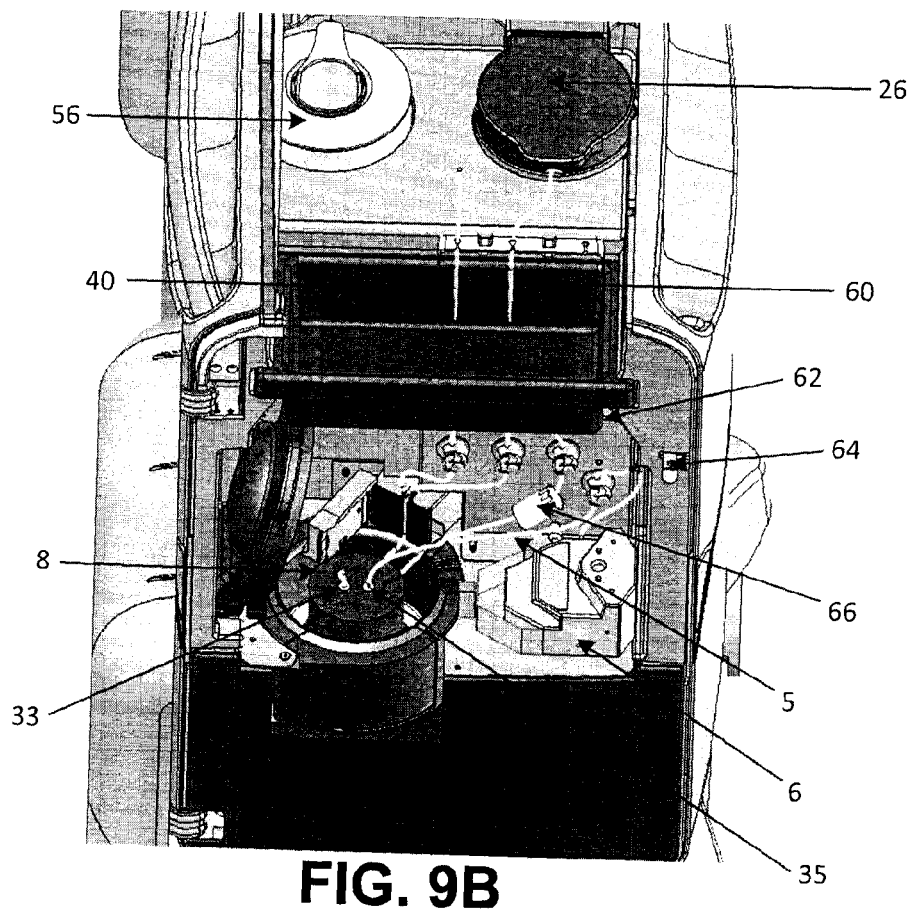
Figure 9C:
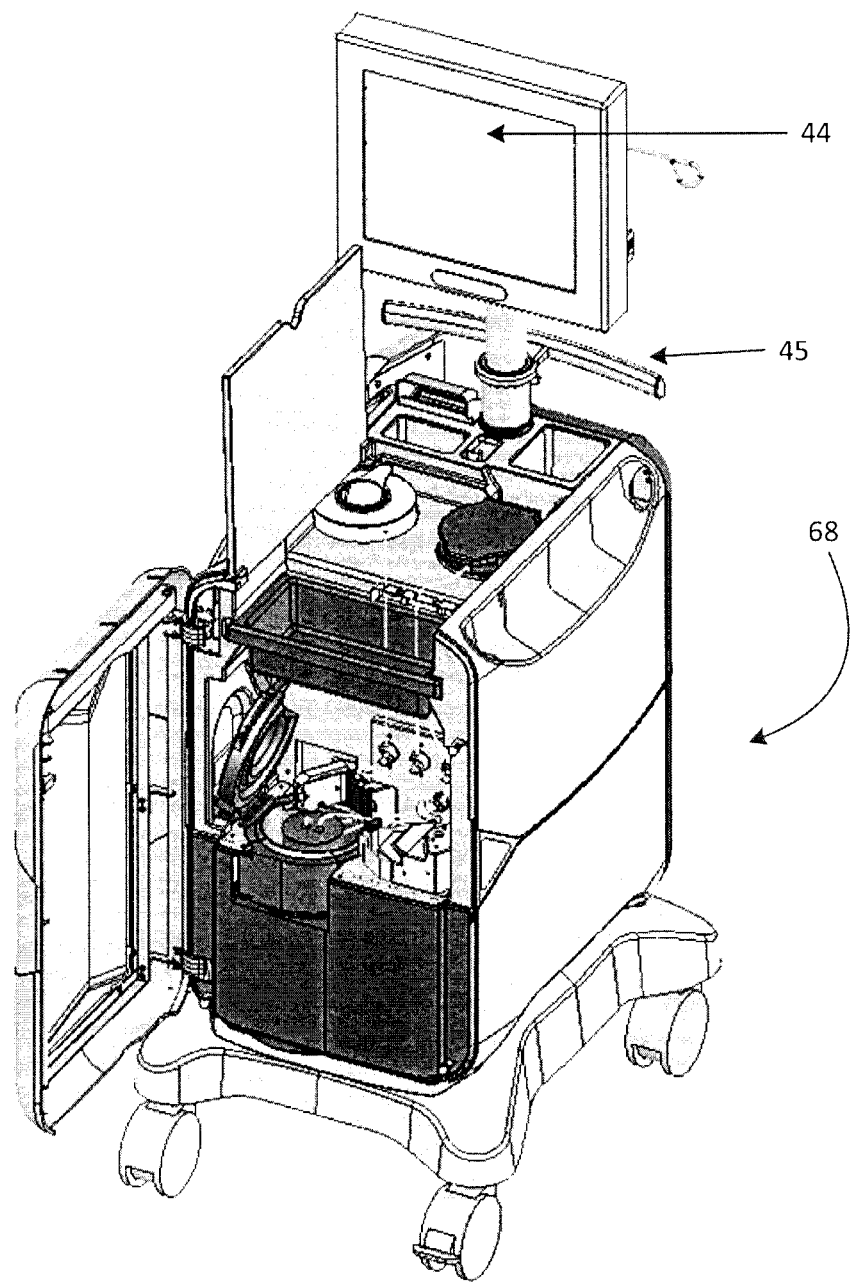

In certain embodiments, the system is embodied in a portable cart that houses some or all of the generator, the processor, the pump, the memory, the patient line, the bypass line, the positron detector, and the dose calibrator. FIGS. 9A, 9B, and 9C depict views of the system embodied in such a portable cart 68. The cart 68 itself can comprise an interior 70 that is coated with a vibration-absorbing material. Among other elements, FIG. 9A depicts the printer 50 and a dose calibrator controller 57. Among other features, FIG. 9B depicts a dose calibrator 56, a patient line 40 (sometimes referred to as a dose calibrator line), a generator 8 having a saline in 35 and an out 33 for measuring $^{82}$Rb activity in the generator 8, a waste collection vessel 26, a waste line 60, a pressure sensor 62 (depicted here as being coupled to the bypass line), a Y-junction 64 into which saline may flow, a flow regulator 66 on the bypass line, a generator line in 5, and a peristaltic pump 6. Among other features, FIG. 9C depicts a user interface 44 comprising a touch-screen monitor, and a handle 45 to push the cart.

Figure 10:
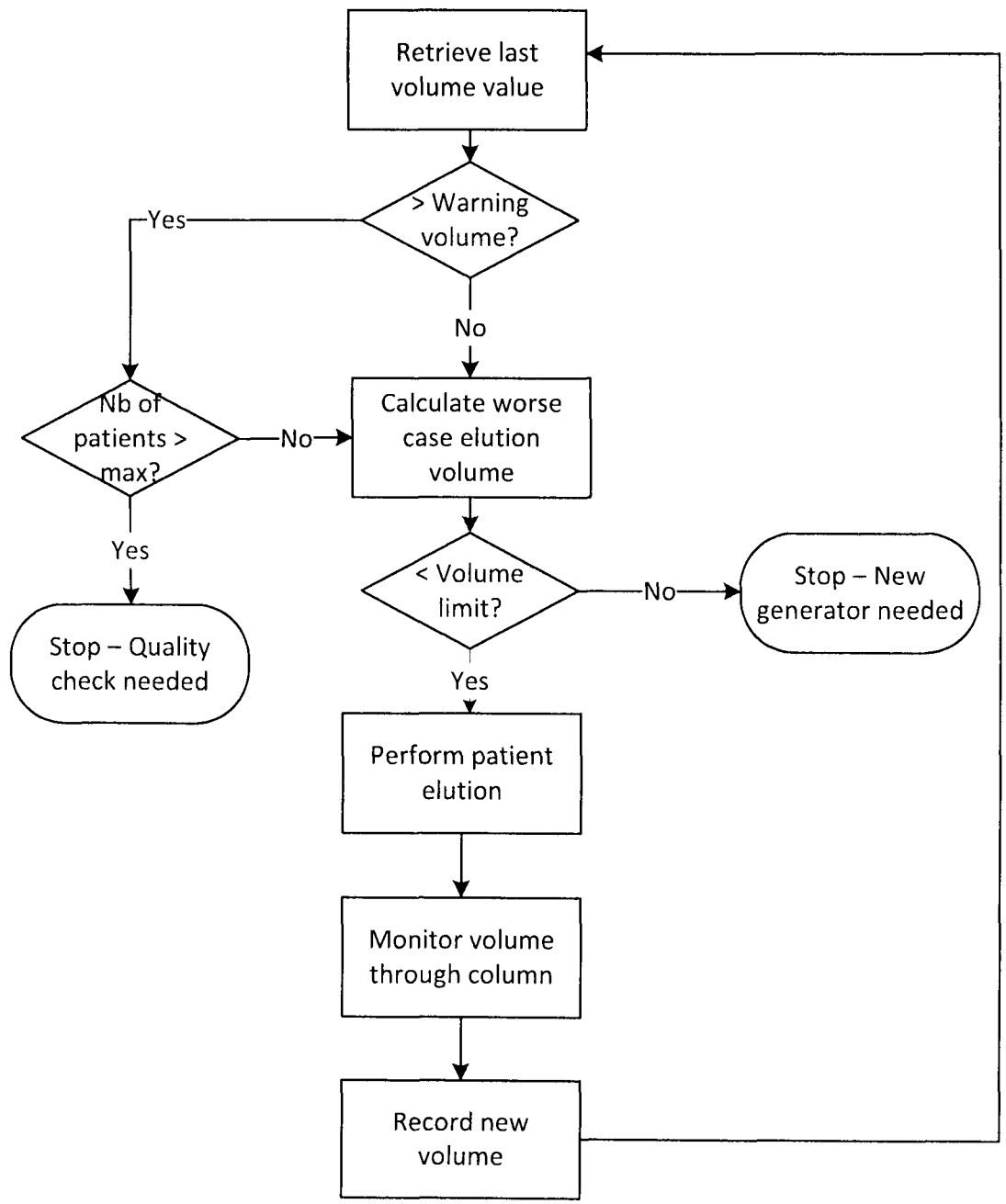
FIG. 10 is a flow chart illustrating exemplary operations for assessing the volume flow through a generator column of a Rubidium elution system.

FIG. 10 is a flow chart illustrating exemplary operations for assessing the volume flow of a Rubidium elution system. It may be appreciated that there are embodiments of the invention that do not implement all of the operations of FIG.

10 (and FIGS. 11-13), or implement the depicted operations in a different order than is depicted.

The operations begin with retrieving a most recently detected or "last" volume value. This may be the volume of fluid that has been eluted by the generator since the generator was last replaced. Then, flow of fluid through the generator is started. The volume of fluid that passes through the generator (sometimes referred to as a column) may be monitored, and that volume may be periodically recorded. In the depicted example, the volume is recorded once per second. The recorded volume may be compared against a threshold value—for example, 30 L. Where the recorded volume is less than a specified maximum volume limit, the operations return to monitoring the volume of fluid that passes through the generator. Where the recorded volume reaches the limit, the controller may be configured to prevent the system from performing further elutions until the generator is replaced.

Figure 11:
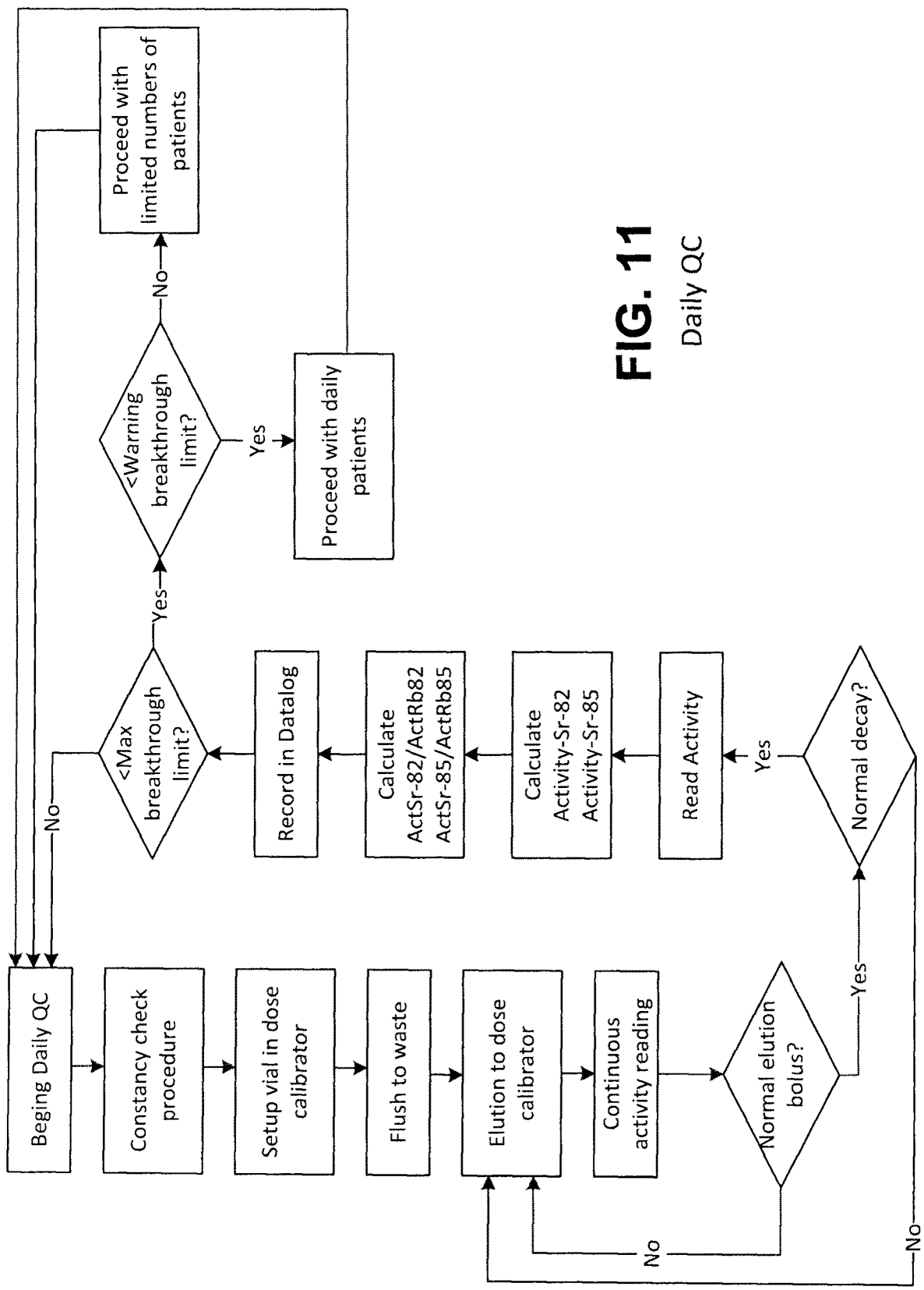
FIG. 11 is a flow chart illustrating exemplary operations for a periodic quality check assessment of a Rubidium elution system.

FIG. 11 is a flow chart illustrating exemplary operations for a periodic quality check assessment of a Rubidium elution system. As depicted, the operations may begin by optionally verifying dose calibrator constancy, then by setting up a vial (such as a 50 mL vial) in a dose calibrator, such as the dose calibrator depicted in FIG. 9. Then, the quality check assessment may begin. Some amount of fluid may be sent through the system to waste. This fluid may be an inactive saline solution that is used to clear any residual active saline solution that may be present in the system. For instance, the fluid may be sent via the bypass line, bypassing the generator.

Then, more fluid may be sent through the generator to the dose calibrator and a concentration of $^{82}$Rb may be calculated for this fluid. The concentration of $^{82}$Rb may be periodically monitored, for example, once per second for 30 minutes. Additionally, a half-life of $^{82}$Rb in the fluid may be measured to ensure that no one tampers with the system. Where a continuous decay is not measured, that may indicate that tampering or system malfunction has occurred, and an error may be raised.

Where there is an isotope of the fluid that has a half-life of approximately 76 seconds, the respective concentrations of other radioactive moieties in the fluid may be determined. For example, concentration of $^{82}$Sr and $^{85}$Sr in the fluid may be determined. Then, a ratio of the concentration of $^{82}$Rb to $^{82}$Sr, and a ratio of the concentration of $^{82}$Rb to $^{85}$Sr may be determined. These ratios may be then recorded in a data log.

Then, a measurement of the concentration of a radioactive moiety relative to the applicable USP (United States Pharmacopeial Convention standard) may be taken, and actions taken based on this measurement. Where the measured value reaches a maximum threshold (for example, at least 50%) of the applicable USP standard, the system may be placed into a fail or error state, and no further patient elutions performed until the generator has been replaced and/or an assessment shows that the concentration of a radioactive moiety relative to the USP is at an acceptable level. Where the measured value is less than a warning level of the applicable USP standard (for example, 20% thereof), elutions may occur normally, and patients treated. Where the measured value is between the warning and limit thresholds, a delimited number of patients (four example, one to four patients) may be treated before additional assessment or calibration is required. As depicted, where the measured value is at least 20% but less than 50% of the applicable USP standard, up to four patients may be treated by the elution system before further assessment is required.

The operations of FIG. 11 (or FIG. 10 or 12-13) may be performed periodically, such as once per day. For instance, where it is determined that no assessment has been performed within a predetermined period of time preceding the particular moment (for example, within the past hour, two hours, four hours, six hours, eight hours, twelve hours, eighteen hours, 24 hours, 36 hours, or 48 hours), the system may require that an assessment check be performed before performing an additional elution. In other embodiments, where it is determined that from the assessment performed indicates that the $^{82}$Sr or $^{85}$Sr concentration is above a threshold, a flush elution may be performed before performing a patient elution. A flush elution may be considered to be an elution that flushes the system, such as by running inactive saline solution through the system via the bypass line. A patient elution may be considered to be an elution that delivers saline solution containing an active moiety to a patient for medical treatment purposes. Alternatively, where $^{82}$Sr or $^{85}$Sr concentration is above a threshold, embodiments of the invention may prevent a patient elution from being performed until a flush elution and a successful calibration elution have been performed.

Figure 12:
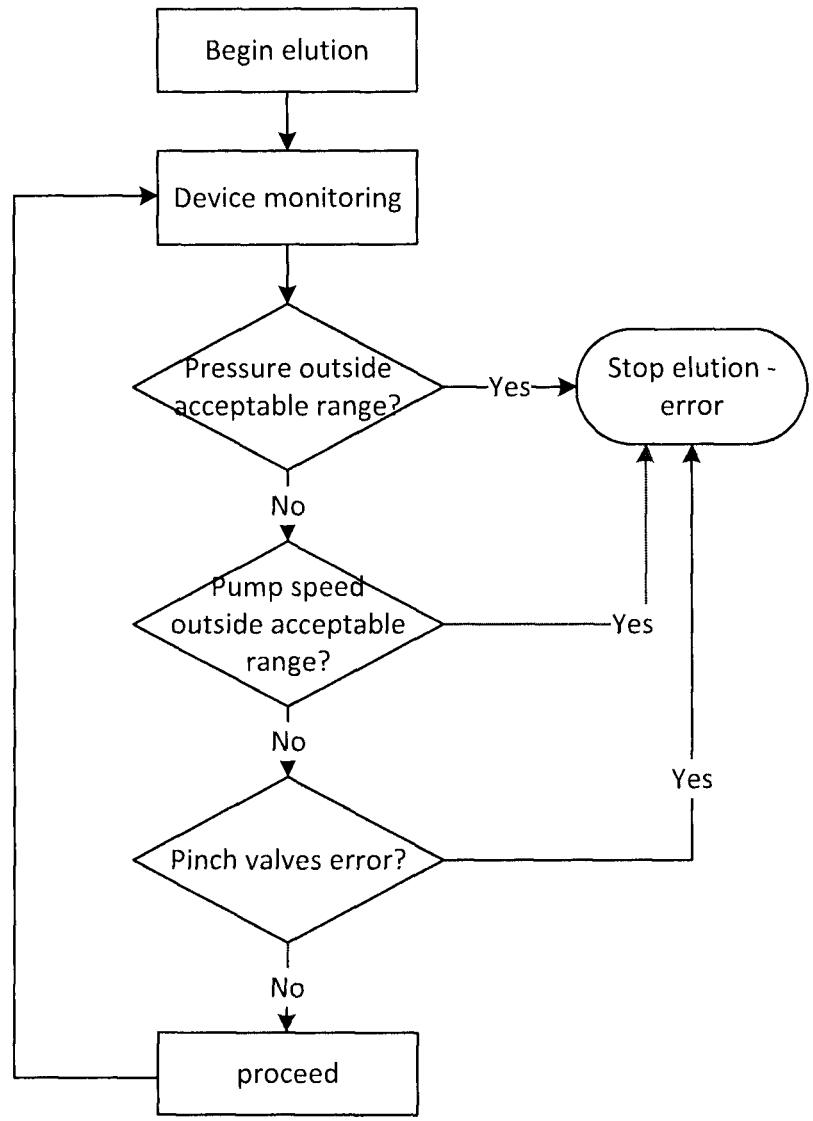
FIG. 12 is a flow chart illustrating exemplary operations for detection of device malfunctions in a Rubidium elution system.

FIG. 12 is a flow chart illustrating exemplary operations for detection of any malfunction in a Rubidium elution system. As depicted, the operations start with beginning an elution. Then, a parameter, such as in-line pressure, is measured, in this case by the pressure detector of FIG. 9, which sends pressure measurements to the controller of FIG. 9. The controller may then assess this pressure. If the pressure is outside an acceptable range, the pump that pumps fluid to the generator and bypass line is shut off or otherwise stopped. Where the pressure is within limits, elution may proceed, and pressure may be further monitored. A similar verification may be performed with respect to the pump device. For example, the controller may periodically compare the current pump speed with the requested speed. If the difference exceeds an acceptable margin, the controller elution is stopped. Finally, the controller may continuously verify the state of each pinch valve. If a pinch valve is not synchronized with the expected state, an error is signaled and the controller stops the elution. Thus, the memory of the present systems may bear processor-executable instructions that, when executed on the processor, cause the system to stop the pump in response to the determination of a malfunction, for example, of the pump, of the pressure sensor, of a pinch valve, or of the photon counter.

Figure 13:
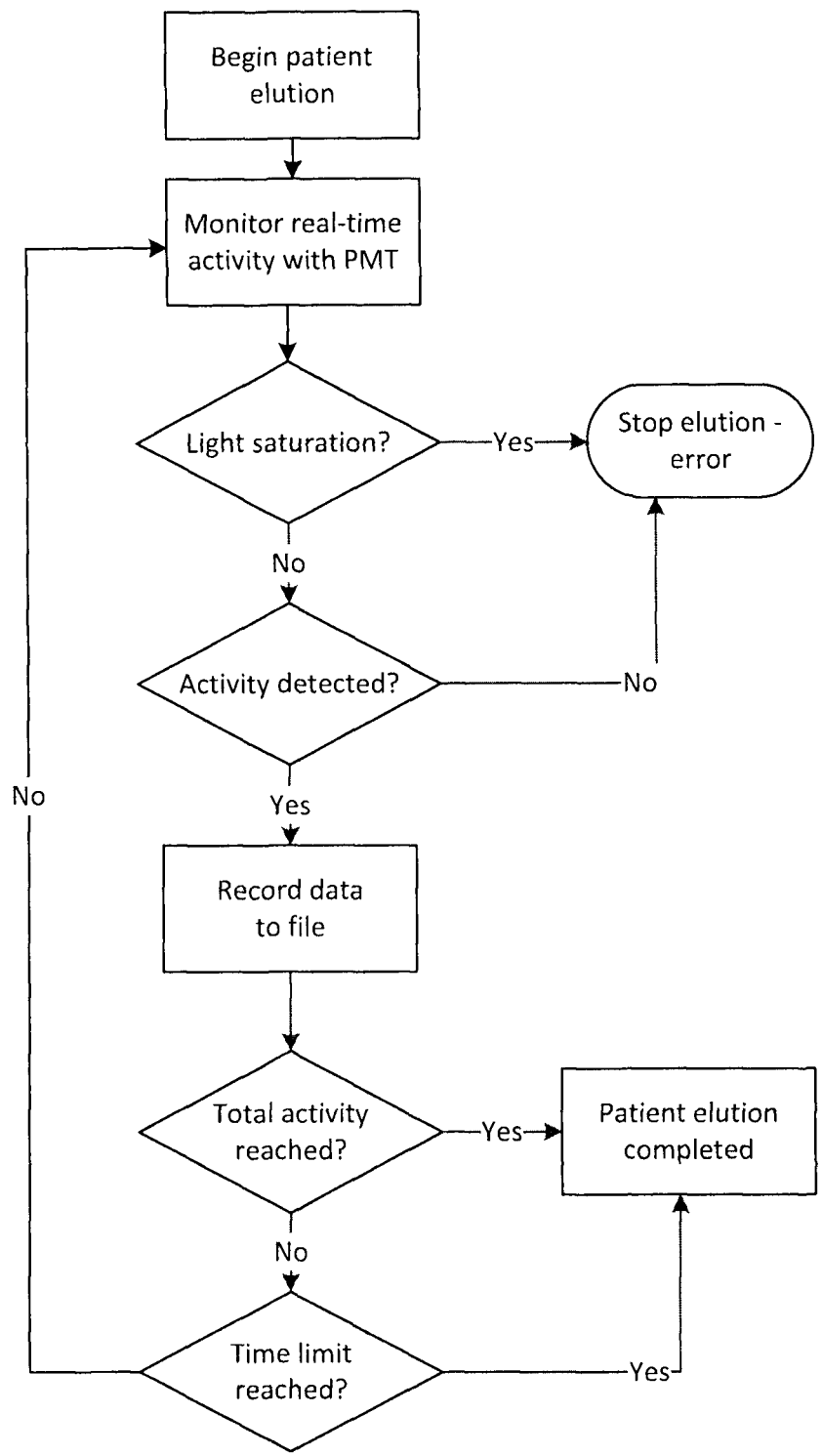
FIG. 13 is a flow chart illustrating exemplary operations for activity monitoring of a Rubidium elution system.

FIG. 13 is a flow chart illustrating example operations for activity monitoring of a Rubidium elution system. The operations start with beginning a patient elution. While the patient elution occurs, real-time activity is monitored with a photomultiplier tube (PMT), such as in the e+ detector of FIG. 9. This monitored data may be sent to the controller of FIG. 9. In addition to sending data to the controller, the data may be recorded. As depicted, the data is recorded periodically (for example, once per second) and saved to a file, such as a file on the user interface computer of FIG. 9. The combination of sending data to the controller and recording the data may continue for the duration of the patient elution. Any PMT malfunction detected by the controller during the process may trigger an interruption of the elution.

Figure 14:
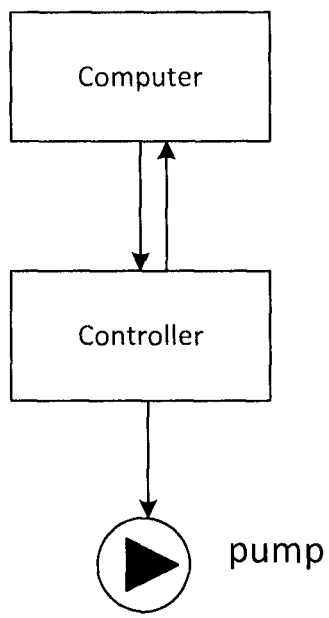
FIG. 14 is a block diagram schematically illustrating principal elements used in shutting down a pump of a Rubidium elution system.

FIG. 14 is a block diagram schematically illustrating principal elements used in shutting down a pump of a Rubidium elution system. Depicted are a computer, which may be the user interface computer of FIG. 9, a controller, which may be the controller of FIG. 9, and a pump, which may be the pump of FIG. 9. The controller is depicted as being communicatively coupled to both the computer and the pump. When the controller loses communication with the computer (which may include a processor), the controller detects this and may shut down the pump in response. This may be done as a safety feature, so that the system only operates when sufficient safety monitoring occurs, or to prevent users from tampering with the system, and possibly operating the system in an unsafe manner.

Through implementing the operations of FIGS. 10-14, the following aspects of fully automated quality control verification may be accomplished. A daily constancy check on the dose calibrator may be performed. A daily flush of the system may be sent to waste. The patient line may be automatically primed. Flow rate may be calibrated for every new generator. The total volume that passes through the generator may be monitored and recorded in a data file. A daily automatic verification of $^{82}$Sr and $^{85}$Sr levels may be performed, with decay monitored to ensure that the vial is not removed prematurely. Pressure verification may be performed during every elution to ensure patient safety, and allow for trending to predict any problems with the generator (e.g., increasing pressure may be indicative of blockages in the line or in the generator column). A photomultiplier tube in-line allows for accurate determination of the amount of injected activity: (1) an accurate determination of the radioactivity received by the patient; (2) an injection of the proper amount of activity based on patient size (e.g., as low as 37 MBq for pediatric patients, and as high as 370 MBq for obese patients); (3) allows for in-use trending on each generator; and (4) allows for three infusion models—constant flow-rate, constant volume, and constant activity-rate. Non-patient specific data may be uploaded daily from each elution system to a remote server. Data may then be retrieved by the generator manufacturer, and in-use generator performance may be determined. This allows for daily monitoring of generator and infuser performance and for preventative intervention before patients are affected. Constant feedback may be sent from the computer to the peristaltic pump. If the user interface fails to operate, the peristaltic pump may be shut down to prevent risk to a patient.

Embodiments of the invention may be implemented on a computer system that comprises a processor, and a memory communicatively coupled to the processor when the system is operational, the memory bearing processor-executable instructions, that when executed on the processor, cause the system to perform embodiments of the invention. Embodiments of the invention may also be implemented as a computer-implemented method. Additionally, embodiments of the invention may be implemented as computer-executable instructions stored on computer-readable storage media. Computer readable storage media may be distinguished from computer-readable communications media that include transitory signals.

The embodiments of the invention described above are intended to be exemplary only.

What is claimed:

1. An $^{82}$Sr/$^{82}$Rb elution system, comprising:
   a $^{82}$Sr/$^{82}$Rb generator;
   a pump;
   a processor;
   a positron detector;
   a patient outlet for delivery of fluid from the positron detector to a patient;
   fluid flow lines comprising a feed line that permits fluid flow from the pump to the generator, a generator line that permits fluid flow from the generator to the positron detector, and a patient line that permits fluid flow from the positron detector to the patient outlet;
   a user interface; and
   a memory communicatively coupled to the processor, the memory bearing processor-executable instructions that, in response to being executed on the processor, cause the system to at least:
   (i) begin a quality control procedure comprising an assessment of a concentration of $^{82}$Rb, $^{82}$Sr, or $^{85}$Sr in a fluid that is eluted from the generator;
   (ii) in response to completion of the assessment,
       (a) generate an output on the user interface that recommends a course of action or no course of action, based on a result of the assessment, or
       (b) store an indication of the result of the assessment in a memory location, and upload the indication of the result of the assessment to a computer via a communications network; and
   (iii) in response to user interruption of the assessment, halting the generator.

2. The system of claim 1, further comprising:
   a controller communicatively coupled with the pump and the processor, the controller shutting down the pump in response to determining that communication with the processor has been lost.

3. The system of claim 1, wherein the memory further bears instructions that, in response to being executed on the processor, cause the system to at least:
   in response to determining that a total volume of the fluid eluted exceeds a limit threshold, preventing elution until the generator is replaced with a new generator.

4. The system of claim 1, wherein the memory further bears instructions that, in response to being executed on the processor, cause the system to at least:
   in response to determining that a ratio of $^{82}$Sr to $^{82}$Rb, or $^{85}$Sr to $^{82}$Rb in the fluid eluted from the generator is greater than a maximum threshold of USP, preventing elution until the generator is replaced with a new generator.

5. The system of claim 1, wherein the memory further bears instructions that, in response to being executed on the processor, cause the system to at least:
   in response to determining that a ratio of $^{82}$Sr to $^{82}$Rb, or $^{85}$Sr to $^{82}$Rb in the fluid eluted from the generator is greater than a warning threshold of USP, performing an additional assessment after a delimited number of patients are treated with the system since determining that the ratio of $^{82}$Sr to $^{82}$Rb, or $^{85}$Sr to $^{82}$Rb Rb in the fluid eluted from the generator is greater than the warning threshold of USP.

6. The system of claim 1, wherein the memory further bears processor-executable instructions that, in response to being executed on the processor, cause the system to at least in response to determining that the pressure of the fluid in the fluid flow lines is outside an acceptable range, stopping the pump.

7. The system of claim 1, further comprising:
   (i) a generator valve or a patient valve and (ii) a pressure sensor; and
   wherein the memory further bears processor-executable instructions that, in response to being executed on the processor, cause the system to stop the pump in response to identifying a malfunction of the pump, the pressure sensor, the generator valve, the patient valve, or the positron detector.

8. The system of claim 1, wherein the memory further bears instructions that, in response to being executed on the processor, cause the system to at least:
   in response to determining that a half-life of an isotope in the fluid eluted is not indicative of $^{82}$Rb, perform an assessment where the elution is not provided to a patient before performing an assessment where an elution is provided to the patient.

9. The system of claim 1, wherein the assessment comprises:
   determining a ratio of $^{82}$Sr to $^{82}$Rb and a ratio of $^{85}$Sr to $^{82}$Rb in the fluid.

10. The system of claim 1, further comprising a dose calibrator for measuring generator performance and a portable cart that houses the generator, the processor, the pump, the memory, the patient line, and the positron detector.

11. The system of claim 10, wherein the cart comprises an interior that is coated with a vibration-absorbing material.

12. The system of claim 1, wherein the memory bears further instructions that, in response to being executed on the processor, cause the system to at least:
   in response to determining that the quality control procedure has not been performed within a predetermined period of time preceding the execution of said further instructions, perform the quality control procedure before performing an additional patient elution.

13. The system of claim 12, wherein the memory bears additional instructions that, in response to being executed on the processor, cause the system to at least:
   in response to determining from the quality control procedure performed that the $^{82}$Sr or $^{85}$Sr concentration is above a threshold, perform a flush elution and a calibration elution before performing a patient elution.

14. The system of claim 1, wherein when the system stores an indication of the result of the assessment in a memory location, the instructions in response to being executed upon the processor further cause the computer to combine the result of the quality control procedure with a result of a quality control procedure of another $^{82}$Sr/$^{82}$Rb elution system.

* * * * *